US012696192B2

(12) United States Patent
Li et al.

(10) Patent No.: US 12,696,192 B2
(45) Date of Patent: Jul. 28, 2026

(54) SIDELINK DISCONTINUOUS RECEPTION MANAGEMENT FOR GROUPCAST AND BROADCAST

(71) Applicant: QUALCOMM Incorporated, San Diego, CA (US)

(72) Inventors: Qing Li, Princeton Junction, NJ (US); Hong Cheng, Basking Ridge, NJ (US); Junyi Li, Fairless Hills, PA (US); Dan Vassilovski, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 709 days.

(21) Appl. No.: 17/452,038

(22) Filed: Oct. 22, 2021

(65) Prior Publication Data

US 2022/0346015 A1     Oct. 27, 2022

Related U.S. Application Data

(60) Provisional application No. 63/201,284, filed on Apr. 21, 2021.

(51) Int. Cl.
| | |
|---|---|
| *H04W 52/02* | (2009.01) |
| *H04L 5/00* | (2006.01) |
| *H04W 92/18* | (2009.01) |

(52) U.S. Cl.
CPC ....... _H04W 52/0232_ (2013.01); _H04L 5/0053_ (2013.01); _H04W 92/18_ (2013.01)

(58) Field of Classification Search
CPC .. H04W 52/0232; H04W 92/18; H04L 5/0053
See application file for complete search history.

(56) References Cited

U.S. PATENT DOCUMENTS

| | | | | |
|---|---|---|---|---|
| 11,606,836 B2 * | 3/2023 | Cheng | ............... | H04W 76/14 |
| 11,792,732 B2 * | 10/2023 | Li | .................... | H04W 52/0235 |
| | | | | 370/311 |
| 11,844,065 B2 * | 12/2023 | Li | ....................... | H04L 1/1819 |
| 2015/0124674 A1 * | 5/2015 | Jamadagni | ........ | H04W 52/0216 |
| | | | | 370/311 |

(Continued)

FOREIGN PATENT DOCUMENTS

| | | | | |
|---|---|---|---|---|
| CA | 3161691 A1 * | 5/2021 | ............ | H04W 24/08 |
| EP | 4093097 A1 * | 11/2022 | ............ | H04W 24/08 |

*Primary Examiner* — Mounir Moutaouakil
(74) *Attorney, Agent, or Firm* — ArentFox Schiff LLP

(57) ABSTRACT

Apparatus, methods, and computer-readable media for side-link discontinuous reception (DRX) management for groupcast and broadcast are disclosed herein. A transmitter user equipment (UE) may determine one or more adjustments to a sidelink DRX configuration or DRX operation based on one or more factors of the transmitter UE, and transmit, to a receiver UE over a sidelink channel, during at least a portion of a sidelink DRX active duration, a first message comprising an indication of the one or more adjustments to the sidelink DRX configuration or DRX operation. A receiver UE may receive, from a transmitter UE sent to multiple UEs over a sidelink channel, during a portion of a sidelink DRX active duration, a first message comprising an indication of one or more first adjustments to a sidelink DRX configuration or DRX operation, and determine whether to respond to the indication based on parameters of the receiver UE.

17 Claims, 20 Drawing Sheets

(56)        References Cited

U.S. PATENT DOCUMENTS

| | | | |
|---|---|---|---|
| 2019/0174411 A1 | 6/2019 | Xu et al. | |
| 2021/0195519 A1* | 6/2021 | Sridharan | H04W 52/0235 |
| 2022/0225466 A1* | 7/2022 | Wang | H04W 76/28 |
| 2023/0292395 A1* | 9/2023 | Han | H04W 76/14 |
| 2023/0337140 A1* | 10/2023 | Miao | H04L 5/0053 |
| 2024/0196455 A1* | 6/2024 | L?hr | H04W 76/14 |
| 2024/0373477 A1* | 11/2024 | Ingale | H04W 74/0841 |

* cited by examiner

SL Groupcast
or
SL Broadcast

Groupcast
or
Unicast

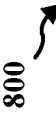

Special UE / Tx UE

Rx UE(s)

1. Preconfigured or configured with a common SL DRX

2. Determine to adjust the SL DRX configuration.

3. MAC CE for adjusting the SL DRX configuration

4. Determine to respond or not

5A. ACK/NACK to receiving the MAC CE (implicitly accepting/rejecting)

5B. ACK to receiving MAC CE

5C. MAC CE with UE's info with a suitable SL DRX adjustment, reason for rejection, etc.

{ (explicitly rejecting)

6. Determine to forward the MAC CE or not

7. Forward the MAC CE

8. Determine to further adjust the SL DRX configuration or not

9. MAC CE to activate or confirm the change (optional)

(Or back to step 3 with a further adjusted SL DRX configuratiom)

SL DRX On duration

SL DRX On duration

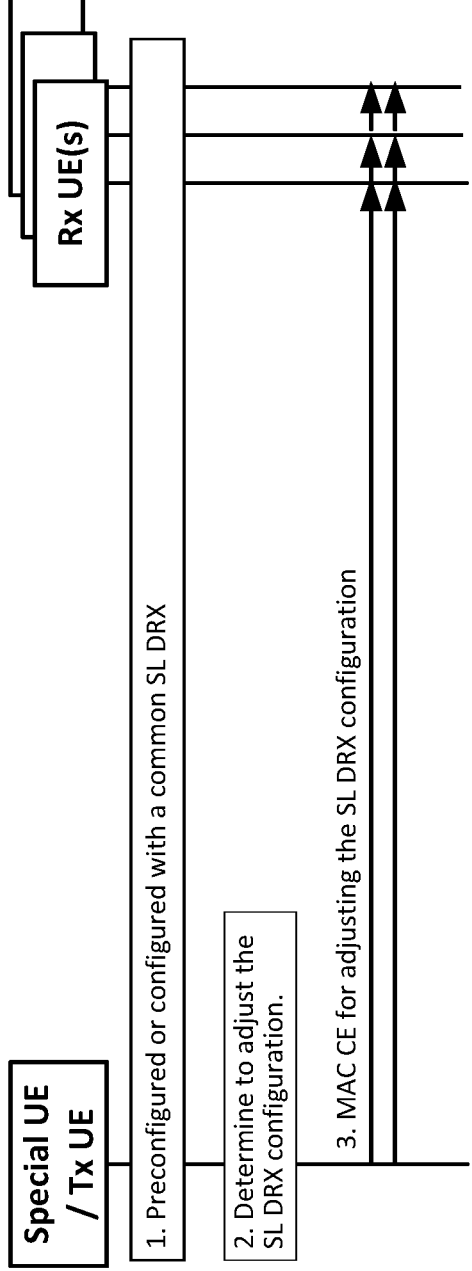
FIG. 9

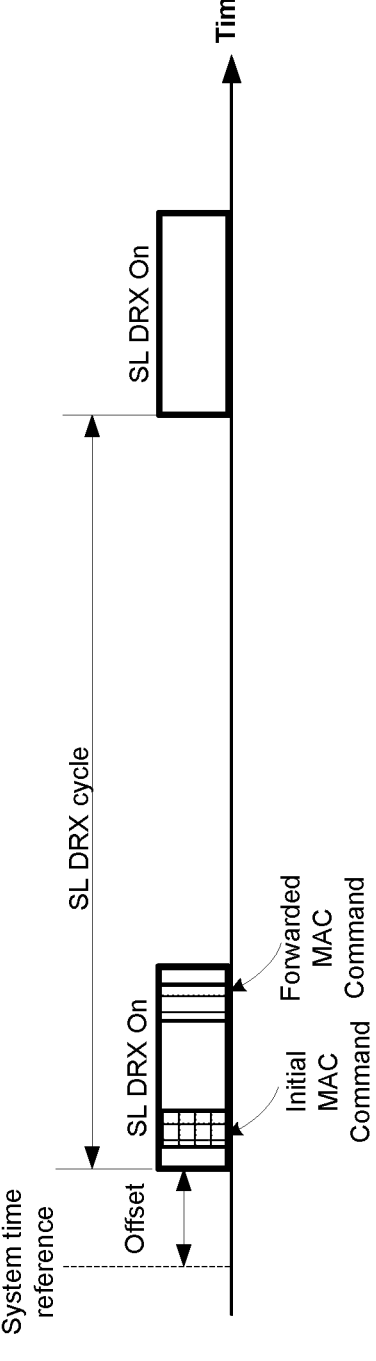
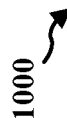
FIG. 10

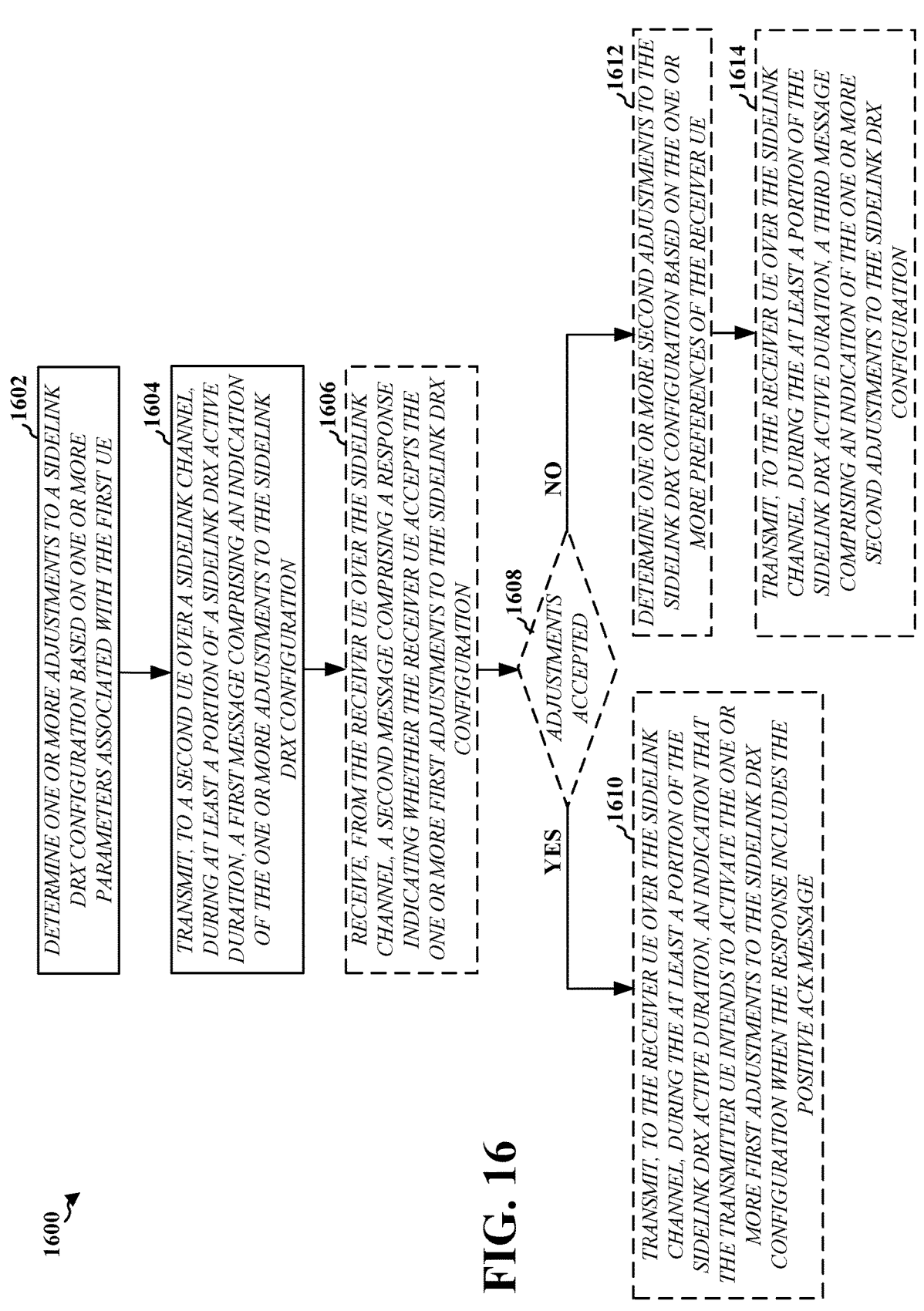

1602 — DETERMINE ONE OR MORE ADJUSTMENTS TO A SIDELINK DRX CONFIGURATION BASED ON ONE OR MORE PARAMETERS ASSOCIATED WITH THE FIRST UE

1604 — TRANSMIT, TO A SECOND UE OVER A SIDELINK CHANNEL, DURING AT LEAST A PORTION OF A SIDELINK DRX ACTIVE DURATION, A FIRST MESSAGE COMPRISING AN INDICATION OF THE ONE OR MORE ADJUSTMENTS TO THE SIDELINK DRX CONFIGURATION

1606 — RECEIVE, FROM THE RECEIVER UE OVER THE SIDELINK CHANNEL, A SECOND MESSAGE COMPRISING A RESPONSE INDICATING WHETHER THE RECEIVER UE ACCEPTS THE ONE OR MORE FIRST ADJUSTMENTS TO THE SIDELINK DRX CONFIGURATION

1608 — ADJUSTMENTS ACCEPTED

YES

1610 — TRANSMIT, TO THE RECEIVER UE OVER THE SIDELINK CHANNEL, DURING THE AT LEAST A PORTION OF THE SIDELINK DRX ACTIVE DURATION, AN INDICATION THAT THE TRANSMITTER UE INTENDS TO ACTIVATE THE ONE OR MORE FIRST ADJUSTMENTS TO THE SIDELINK DRX CONFIGURATION WHEN THE RESPONSE INCLUDES THE POSITIVE ACK MESSAGE

NO

1612 — DETERMINE ONE OR MORE SECOND ADJUSTMENTS TO THE SIDELINK DRX CONFIGURATION BASED ON THE ONE OR MORE PREFERENCES OF THE RECEIVER UE

1614 — TRANSMIT, TO THE RECEIVER UE OVER THE SIDELINK CHANNEL, DURING THE AT LEAST A PORTION OF THE SIDELINK DRX ACTIVE DURATION, A THIRD MESSAGE COMPRISING AN INDICATION OF THE ONE OR MORE SECOND ADJUSTMENTS TO THE SIDELINK DRX CONFIGURATION

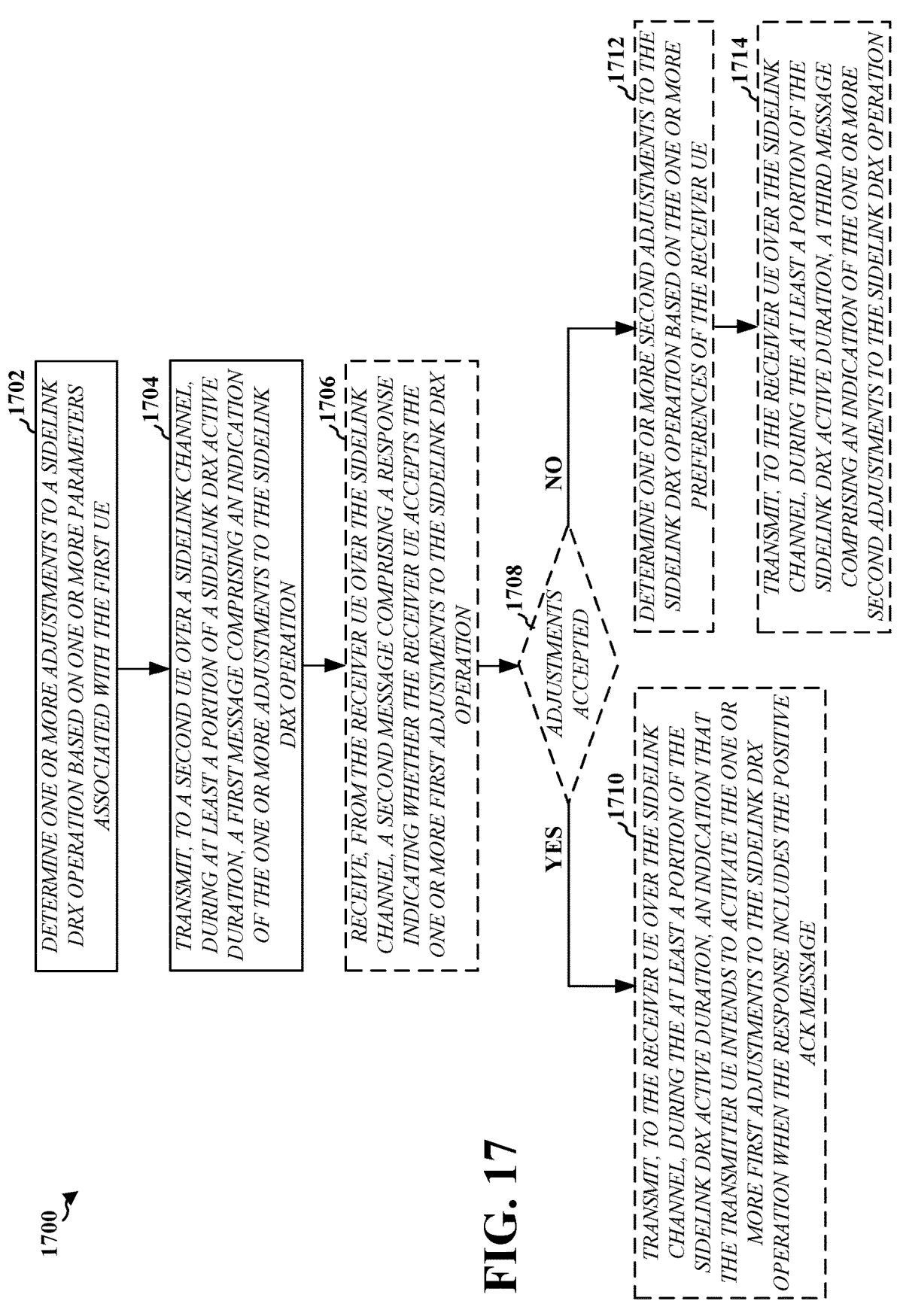

1700

1702
DETERMINE ONE OR MORE ADJUSTMENTS TO A SIDELINK DRX OPERATION BASED ON ONE OR MORE PARAMETERS ASSOCIATED WITH THE FIRST UE

1704
TRANSMIT, TO A SECOND UE OVER A SIDELINK CHANNEL, DURING AT LEAST A PORTION OF A SIDELINK DRX ACTIVE DURATION, A FIRST MESSAGE COMPRISING AN INDICATION OF THE ONE OR MORE ADJUSTMENTS TO THE SIDELINK DRX OPERATION

1706
RECEIVE, FROM THE RECEIVER UE OVER THE SIDELINK CHANNEL, A SECOND MESSAGE COMPRISING A RESPONSE INDICATING WHETHER THE RECEIVER UE ACCEPTS THE ONE OR MORE FIRST ADJUSTMENTS TO THE SIDELINK DRX OPERATION

1708
ADJUSTMENTS ACCEPTED

NO

YES

1710
TRANSMIT, TO THE RECEIVER UE OVER THE SIDELINK CHANNEL, DURING THE AT LEAST A PORTION OF THE SIDELINK DRX ACTIVE DURATION, AN INDICATION THAT THE TRANSMITTER UE INTENDS TO ACTIVATE THE ONE OR MORE FIRST ADJUSTMENTS TO THE SIDELINK DRX OPERATION WHEN THE RESPONSE INCLUDES THE POSITIVE ACK MESSAGE

1712
DETERMINE ONE OR MORE SECOND ADJUSTMENTS TO THE SIDELINK DRX OPERATION BASED ON THE ONE OR MORE PREFERENCES OF THE RECEIVER UE

1714
TRANSMIT, TO THE RECEIVER UE OVER THE SIDELINK CHANNEL, DURING THE AT LEAST A PORTION OF THE SIDELINK DRX ACTIVE DURATION, A THIRD MESSAGE COMPRISING AN INDICATION OF THE ONE OR MORE SECOND ADJUSTMENTS TO THE SIDELINK DRX OPERATION

FIG. 17

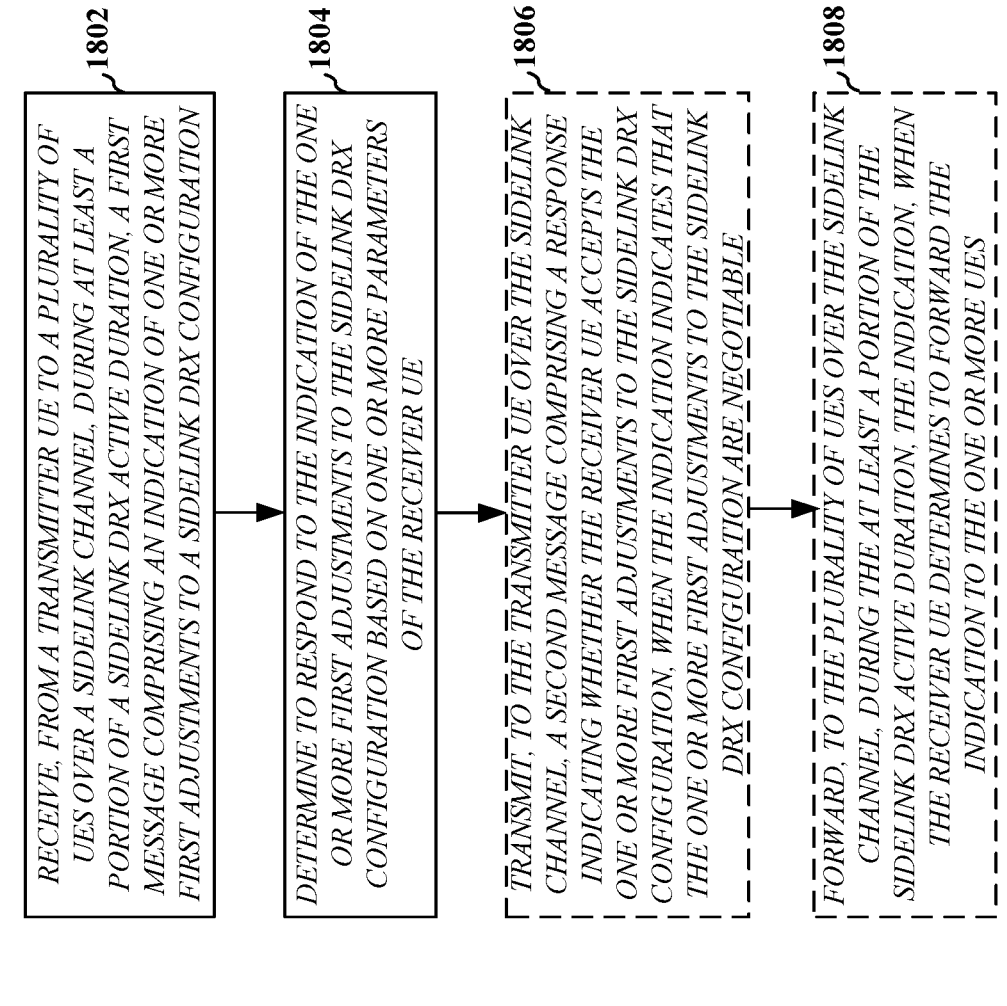

1800

1802

RECEIVE, FROM A TRANSMITTER UE TO A PLURALITY OF UES OVER A SIDELINK CHANNEL, DURING AT LEAST A PORTION OF A SIDELINK DRX ACTIVE DURATION, A FIRST MESSAGE COMPRISING AN INDICATION OF ONE OR MORE FIRST ADJUSTMENTS TO A SIDELINK DRX CONFIGURATION

1804

DETERMINE TO RESPOND TO THE INDICATION OF THE ONE OR MORE FIRST ADJUSTMENTS TO THE SIDELINK DRX CONFIGURATION BASED ON ONE OR MORE PARAMETERS OF THE RECEIVER UE

1806

TRANSMIT, TO THE TRANSMITTER UE OVER THE SIDELINK CHANNEL, A SECOND MESSAGE COMPRISING A RESPONSE INDICATING WHETHER THE RECEIVER UE ACCEPTS THE ONE OR MORE FIRST ADJUSTMENTS TO THE SIDELINK DRX CONFIGURATION, WHEN THE INDICATION INDICATES THAT THE ONE OR MORE FIRST ADJUSTMENTS TO THE SIDELINK DRX CONFIGURATION ARE NEGOTIABLE

1808

FORWARD, TO THE PLURALITY OF UES OVER THE SIDELINK CHANNEL, DURING THE AT LEAST A PORTION OF THE SIDELINK DRX ACTIVE DURATION, THE INDICATION, WHEN THE RECEIVER UE DETERMINES TO FORWARD THE INDICATION TO THE ONE OR MORE UES

FIG. 18

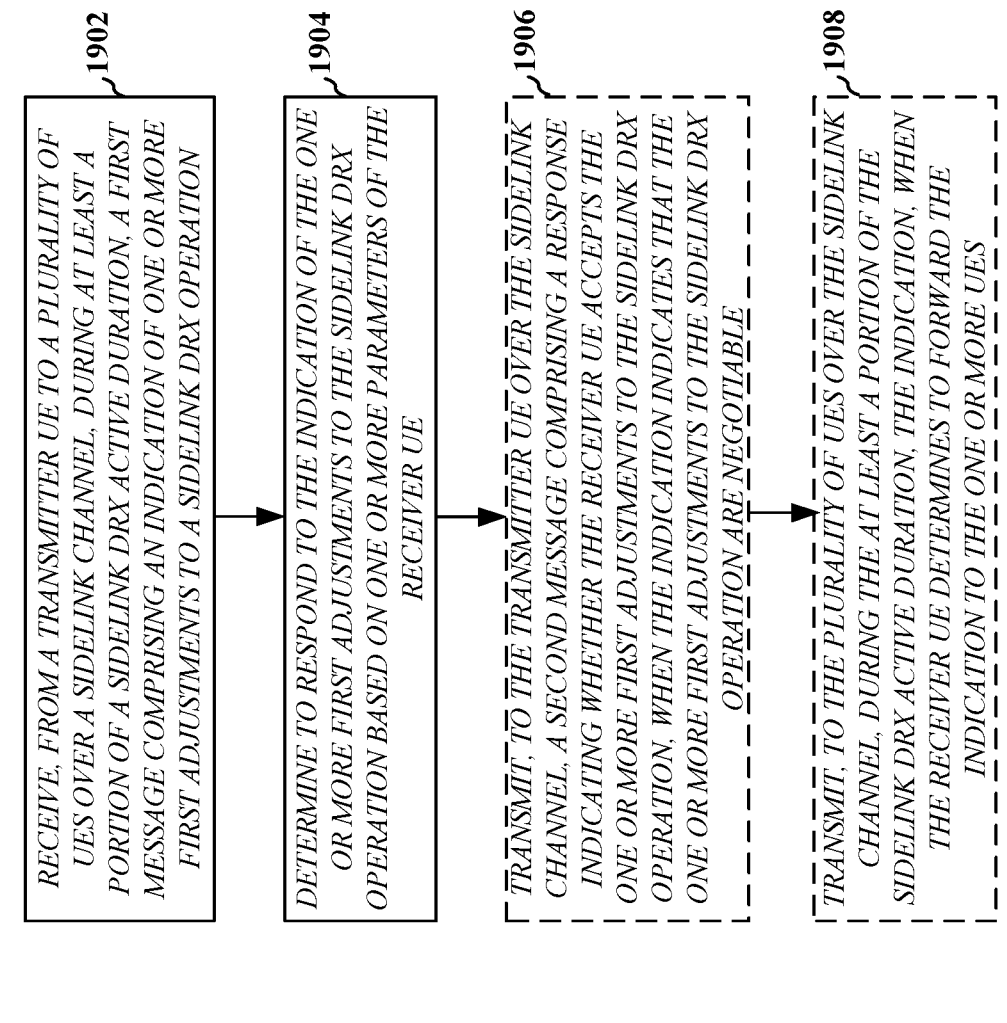

1900

1902

RECEIVE, FROM A TRANSMITTER UE TO A PLURALITY OF UES OVER A SIDELINK CHANNEL, DURING AT LEAST A PORTION OF A SIDELINK DRX ACTIVE DURATION, A FIRST MESSAGE COMPRISING AN INDICATION OF ONE OR MORE FIRST ADJUSTMENTS TO A SIDELINK DRX OPERATION

1904

DETERMINE TO RESPOND TO THE INDICATION OF THE ONE OR MORE FIRST ADJUSTMENTS TO THE SIDELINK DRX OPERATION BASED ON ONE OR MORE PARAMETERS OF THE RECEIVER UE

1906

TRANSMIT, TO THE TRANSMITTER UE OVER THE SIDELINK CHANNEL, A SECOND MESSAGE COMPRISING A RESPONSE INDICATING WHETHER THE RECEIVER UE ACCEPTS THE ONE OR MORE FIRST ADJUSTMENTS TO THE SIDELINK DRX OPERATION, WHEN THE INDICATION INDICATES THAT THE ONE OR MORE FIRST ADJUSTMENTS TO THE SIDELINK DRX OPERATION ARE NEGOTIABLE

1908

TRANSMIT, TO THE PLURALITY OF UES OVER THE SIDELINK CHANNEL, DURING THE AT LEAST A PORTION OF THE SIDELINK DRX ACTIVE DURATION, THE INDICATION, WHEN THE RECEIVER UE DETERMINES TO FORWARD THE INDICATION TO THE ONE OR MORE UES

FIG. 19

SIDELINK DISCONTINUOUS RECEPTION MANAGEMENT FOR GROUPCAST AND BROADCAST

CROSS REFERENCE TO RELATED APPLICATION(S)

This application claims the benefit of U.S. Patent Application No. 63/201,284, entitled "SIDELINK DISCONTINUOUS RECEPTION MANAGEMENT FOR GROUPCAST AND BROADCAST" and filed on Apr. 21, 2021, which is expressly incorporated by reference herein in its entirety.

BACKGROUND

Technical Field

The present disclosure relates generally to communication systems, and more particularly, to sidelink discontinuous reception (DRX) management for groupcast and broadcast.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology.

These improvements may also be applicable to other multi-access technologies and the telecommunication standards that employ these technologies. For example, some aspects of wireless communication include direct communication between devices, such as device-to-device (D2D), vehicle-to-everything (V2X), and the like. There exists a need for further improvements in such direct communication between devices. Improvements related to direct communication between devices may be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Various aspects and features related to power saving in wireless communication systems are described. Some aspects described herein allow supporting multiple power and/or spectrum efficient modes/configurations in wireless communication devices, e.g., such as IoT devices, to facilitate low power operations and/or reduce power consumption.

For sidelink groupcast and broadcast transmissions, a sidelink DRX configuration can be configured as a common configuration for all UEs participating in a groupcast or broadcast. In some aspects, a PC5 Quality-of-Service Identifier (PQI) and/or Layer 2 (L2) Destination Identifier (ID) can be used to derive each of the groupcast DRX configuration and broadcast DRX configuration. In some aspects, timer-based sidelink DRX operation may be applied to sidelink groupcast/broadcast communications.

Sidelink groupcast communications may support an on duration timer. In some aspects, Hybrid Automatic Repeat Request (HARQ) Round Trip Time (RTT) and/or HARQ retransmission are supported in sidelink groupcast communications. In some aspects, an on duration timer is supported for sidelink broadcast communications. The present disclosure provides for how to maintain agreed timers (including exact definition of timers, how to set the timers, when to start/restart/stop the timers, additional consideration due to sidelink characteristics, considerations of both receiver UE and its peer transmitter UE sides).

A sidelink DRX may be formed statically for a groupcast or broadcast transmission based on the destination ID or PQI value, and there may not be any message or signaling for UEs to dynamically adjust or negotiate a sidelink DRX configuration for a groupcast or broadcast transmission. The statically-configured sidelink DRX for a groupcast or broadcast transmission may not be optimized for more dynamic situations, such as the following situations: (1) aperiodic or spontaneous traffic (e.g., an event triggered burst of data transmissions or message exchanges); (2) system load variation (e.g., more data or message exchanges during the rush hours (i.e., at a time) or at an intersection (i.e., at a location)); and/or (3) UE's capability or preference (e.g., the sidelink DRXs that a UE may support, QoS and power saving requirements, etc.). To further optimize a sidelink DRX configuration and/or a sidelink DRX operation for more dynamic situations may be desirable for meeting both QoS and power saving requirements for groupcast or broadcast transmissions.

In an aspect of the disclosure, a method, a computer-readable medium, and an apparatus are provided. The apparatus may be a transmitter user equipment (UE). The apparatus is configured to determine one or more adjustments to a sidelink DRX configuration based on one or more factors of the transmitter UE. The apparatus also is configured to transmit, to a receiver UE over a sidelink channel, during at least a portion of a sidelink DRX active duration, via the transceiver, a first message comprising an indication of the one or more adjustments to the sidelink DRX configuration.

In an aspect of the disclosure, a method, a computer-readable medium, and an apparatus are provided. The apparatus may be a receiver UE. The apparatus is configured to receive, from a transmitter UE over a sidelink channel, during at least a portion of a sidelink DRX active duration, via the transceiver, a first message comprising an indication of one or more first adjustments to a sidelink DRX configuration. In some aspects, the first message is included in a sidelink transmission to a plurality of UEs. The apparatus also is configured to determine whether to respond to the indication of the one or more first adjustments to the sidelink DRX configuration based on one or more parameters of the receiver UE.

In an aspect of the disclosure, a method, a computer-readable medium, and an apparatus are provided. The apparatus may be a transmitter UE. The apparatus is configured to determine one or more adjustments to a sidelink DRX operation based on one or more factors of the transmitter UE. The apparatus also is configured to transmit, to a receiver UE over a sidelink channel, during at least a portion of a sidelink DRX active duration, a first message comprising an indication of the one or more adjustments to the sidelink DRX operation.

In an aspect of the disclosure, a method, a computer-readable medium, and an apparatus are provided. The apparatus may be a receiver UE. The apparatus is configured to receive, from a transmitter UE to a plurality of UEs over a sidelink channel, during at least a portion of a sidelink DRX active duration, via the transceiver, a first message comprising an indication of one or more first adjustments to a sidelink DRX operation. In some aspects, the first message is included in a sidelink transmission to a plurality of UEs. The apparatus also is configured to determine whether to respond to the indication of the one or more first adjustments to the sidelink DRX operation based on one or more parameters of the receiver UE.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 8 illustrates an example of a sidelink communication between wireless devices of a sidelink DRX management technique for adjusting a sidelink DRX configuration dynamically, in accordance with one or more of aspects of the present disclosure.

FIG. 9 illustrates another example of a sidelink communication between wireless devices of a sidelink DRX management technique for adjusting a sidelink DRX configuration dynamically, in accordance with one or more of aspects of the present disclosure.

FIG. 10 illustrates an example of a sidelink DRX management technique for adjusting a sidelink DRX operation dynamically, in accordance with one or more of aspects of the present disclosure.

FIG. 16 is a flowchart illustrating a process of wireless communication that supports sidelink DRX management of a sidelink DRX configuration at a transmitter UE in accordance with some aspects of the present disclosure.

FIG. 17 is a flowchart illustrating a process of wireless communication that supports sidelink DRX management of a sidelink DRX operation at a transmitter UE in accordance with some aspects of the present disclosure.

FIG. 18 is a flowchart illustrating a process of wireless communication that supports sidelink DRX management of a sidelink DRX configuration at a receiver UE in accordance with some aspects of the present disclosure.

FIG. 19 is a flowchart illustrating a process of wireless communication that supports sidelink DRX management of a sidelink DRX operation at a receiver UE in accordance with some aspects of the present disclosure.

DETAILED DESCRIPTION

Figure 1:
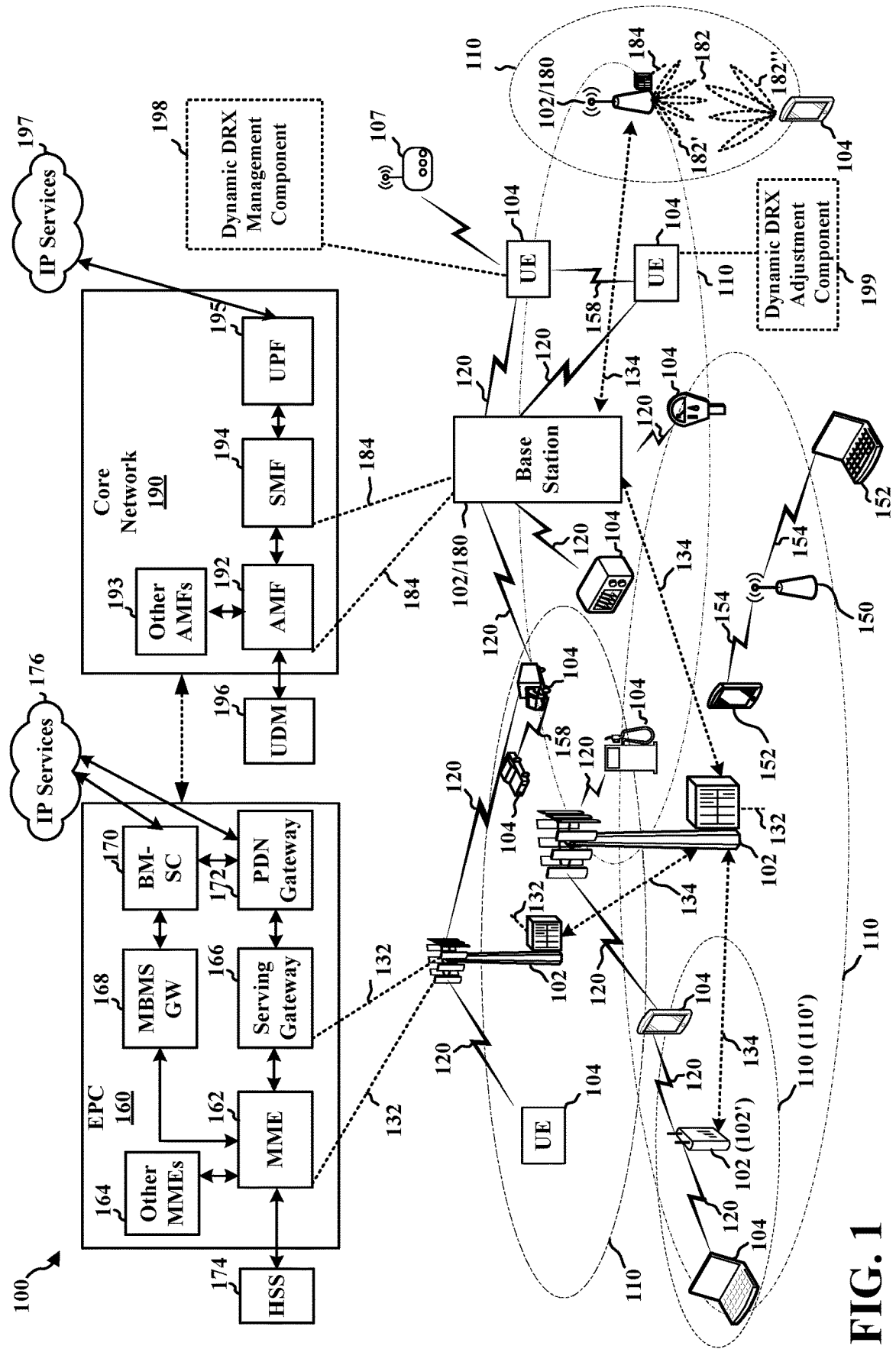
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., 51 interface). The base stations 102 configured for 5G NR (collectively referred to as Next Generation RAN (NG-RAN)) may interface with core network 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. Some wireless communication may be exchanged directly between wireless devices based on sidelink. The communication may be based on vehicle-to-anything (V2X) or other device-to-device (D2D) communication, such as Proximity Services (ProSe), etc. Sidelink communication may be exchanged based on a PC5 interface, for example. For example, the D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Flash- LinQ, WiMedia, Bluetooth, ZigBee, Wi-Fi based on the IEEE 802.11 standard, LTE, or NR.

In sidelink communication, control information may be indicated by a transmitting UE in multiple SCI parts. The SCI may indicate resources that the UE intends to use, for example, for a sidelink transmission. The UE may transmit a first part of control information indicating information about resource reservation in a PSCCH region, and may transmit a second part of the control information in a PSSCH region. For example, a first stage control (e.g., SCI-1) may be transmitted on a PSCCH and may contain information for resource allocation and information related to the decoding of a second stage control (e.g., SCI-2). The second stage control (SCI-2) may be transmitted on a PSSCH and may contain information for decoding data (SCH). Therefore, control information may be indicated through a combination of the first SCI part included in the PSCCH region (e.g., the SCI-1) and the second SCI part included in the PSSCH region (e.g., the SCI-2). In other aspects, control information may be indicated in a media access control (MAC) control element (MAC-CE) portion of the PSSCH.

Some examples of sidelink communication may include vehicle-based communication such as vehicle-to-vehicle (V2V), vehicle-to-infrastructure (V2I) (e.g., from the vehicle-based communication device to road infrastructure nodes such as a Road Side Unit (RSU)), vehicle-to-network (V2N) (e.g., from the vehicle-based communication device to one or more network nodes, such as a base station), vehicle-to-pedestrian (V2P), cellular vehicle-to-everything (C-V2X), and/or a combination thereof and/or with other devices, which can be collectively referred to as V2X communications. As an example, in FIG. 1, a UE 104, e.g., a transmitting Vehicle User Equipment (VUE) or other UE 104, may be configured to transmit messages directly to another UE 104. The communication may be based on V2X or other D2D communication, such as Proximity Services (ProSe), etc. Communication based on V2X and/or D2D may also be transmitted and received by other transmitting and receiving devices, such as Road Side Unit (RSU) 107, etc. Aspects of the communication may be based on PC5 or sidelink communication e.g., as described in connection with the example in FIG. 3. Although the following description may provide examples for V2X/D2D communication in connection with 5G NR, the concepts described herein may be applicable to other similar areas, such as LTE, LTE-A, CDMA, GSM, and other wireless technologies.

Further, although the present disclosure may focus on vehicle-to-pedestrian (V2P) communication and pedestrian-to-vehicle (P2V) communication, the concepts and various aspects described herein may be applicable to other similar areas, such as D2D communication, IoT communication, vehicle-to-everything (V2X) communication, or other standards/protocols for communication in wireless/access networks.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available. The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (e.g., 3 GHz-300 GHz) has extremely high path loss and a short range. The mmW base station 180 may utilize beamforming 182 with the UE 104 to compensate for the extremely high path loss and short range.

The base station 180 may transmit a beamformed signal to the UE 104 in one or more transmit directions 182'. The UE 104 may receive the beamformed signal from the base station 180 in one or more receive directions 182''. The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may include a dynamic DRX management component 198, which is configured to determine one or more first adjustments to a sidelink discontinuous reception configuration based on one or more parameters associated with the transmitter UE. The dynamic DRX management component 198 is also configured to transmit, to a receiver UE over a sidelink channel, during at least a portion of a sidelink DRX active duration, a first message comprising an indication of the one or more first adjustments to the sidelink DRX configuration. In other aspects, the dynamic DRX management component 198 is configured to determine one or more first adjustments to a sidelink discontinuous reception operation based on one or more parameters associated with the transmitter UE. The dynamic DRX management component 198 is also configured to transmit, to a receiver UE over a sidelink channel, during at least a portion of a sidelink DRX active duration, a first message comprising an indication of the one or more first adjustments to the sidelink DRX operation. Furthermore, in certain aspects, the other UE 104 may include a dynamic DRX adjustment component 199, which is configured to receive, from a transmitter UE to a plurality of UEs over a sidelink channel, during at least a portion of a sidelink DRX active duration, via the transceiver, a first message comprising an indication of one or more first adjustments to a sidelink DRX configuration. The dynamic DRX adjustment component 199 is also configured to determine whether to respond to the indication of the one or more first adjustments to the sidelink DRX configuration based on one or more parameters of the receiver UE. In other aspects, the dynamic DRX adjustment component 199 is configured to receive, from a transmitter UE to a plurality of UEs over a sidelink channel, during at least a portion of a sidelink DRX active duration, via the transceiver, a first message comprising an indication of one or more first adjustments to a sidelink DRX operation. The dynamic DRX adjustment component 199 is also configured to determine whether to respond to the indication of the one or more first adjustments to the sidelink DRX operation based on one or more parameters of the receiver UE. Further related aspects and features are described in more detail in connection with FIGS. 5-19. Although the following description may be focused on 5G NR, the concepts described herein may be applicable to other similar areas, such as LTE, LTE-A, CDMA, GSM, and other wireless technologies.

Figures 2A, 2B, 2C, 2D:
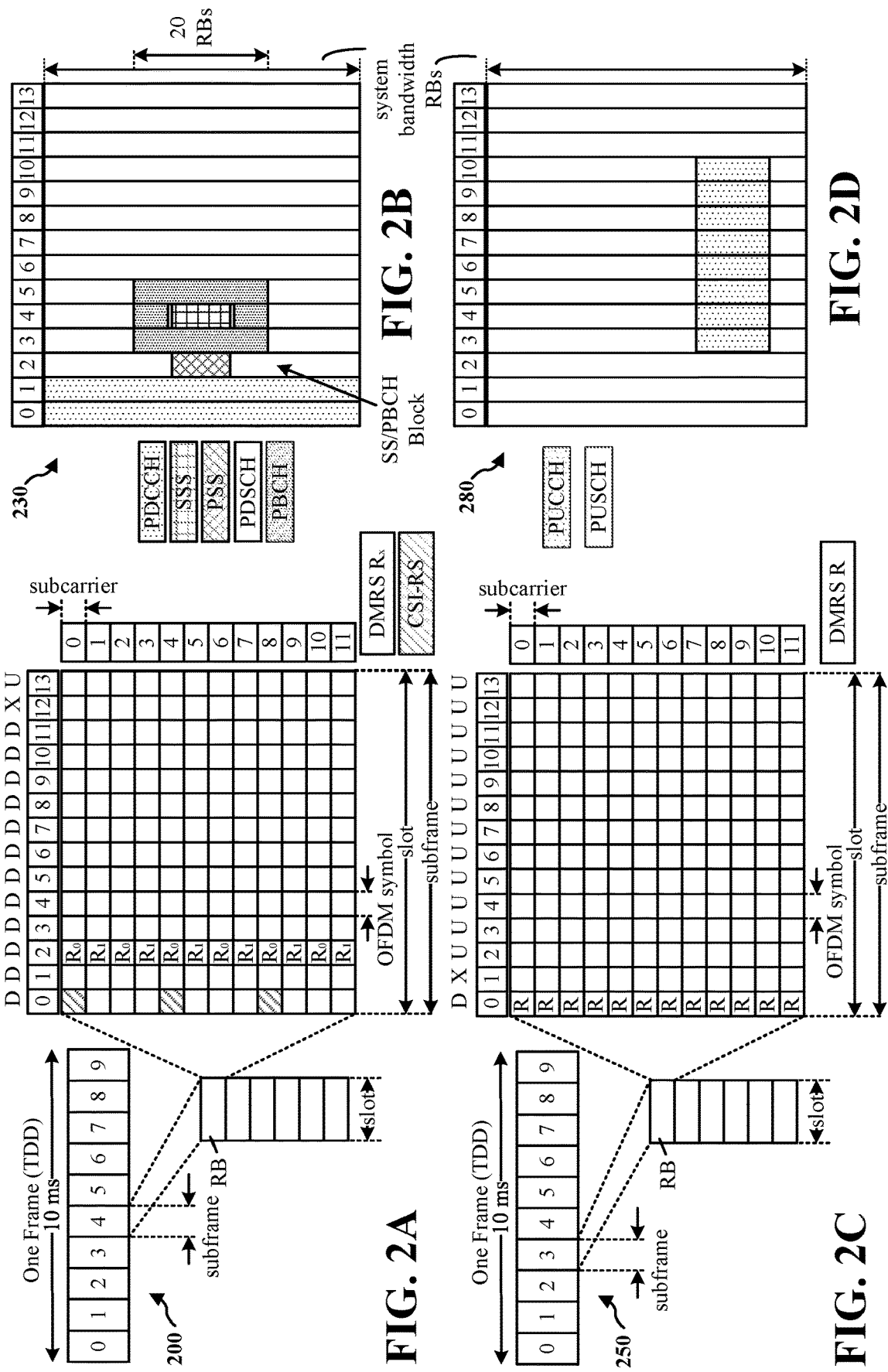
FIGS. 2A, 2B, 2C, and 2D are diagrams illustrating examples of a first 5G/NR frame, DL channels within a 5G/NR subframe, a second 5G/NR frame, and UL channels within a 5G/NR subframe, respectively.

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The subcarrier spacing and symbol length/duration are a function of the numerology. The subcarrier spacing may be equal to $2^\mu * 15$ kHz, where $\mu$ is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 2A-2D provide an example of slot configuration 0 with 14 symbols per slot and numerology $\mu=0$ with 1 slot per subframe. The subcarrier spacing is 15 kHz and symbol duration is approximately 66.7 µs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
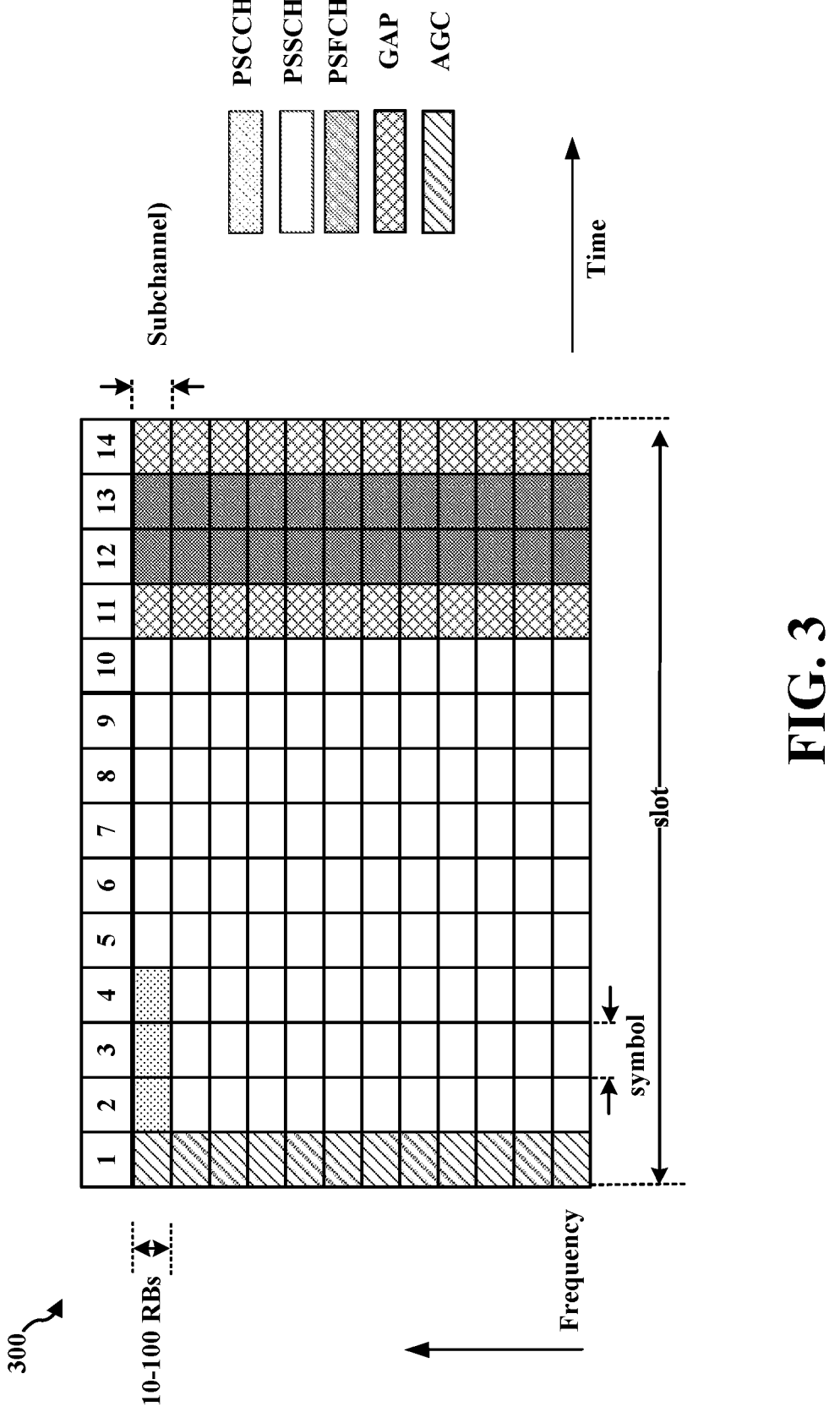
FIG. 3 illustrates example aspects of a sidelink slot structure.

FIG. 3 illustrates example diagram 300 illustrating non-limiting examples of time and frequency resources that may be used for wireless communication based on sidelink. In some examples, the time and frequency resources may be based on a slot structure. In other examples, a different structure may be used. The slot structure may be within a 5G/NR frame structure in some examples. Although the following description may be focused on 5G NR, the concepts described herein may be applicable to other similar areas, such as LTE, LTE-A, CDMA, GSM, and other wireless technologies. This is merely one example, and other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. Diagram 300 illustrates a single slot transmission, e.g., which may correspond to a 0.5 ms transmission time interval (TTI).

A resource grid may be used to represent the frame structure. Each time slot may include a resource block (RB) (also referred to as physical RBs (PRBs)) that extends 12 consecutive subcarriers. The resource grid is divided into multiple resource elements (REs). The number of bits carried by each RE depends on the modulation scheme. Diagram 300 also illustrates multiple subchannels, where each subchannel may include multiple RBs. For example, one subchannel in sidelink communication may include 10-100 RBs. As illustrated in FIG. 3, the first symbol of a subframe may be a symbol for automatic gain control (AGC). Some of the REs may include control information, e.g., along with PSCCH and/or PSSCH. The control information may include Sidelink Control Information (SCI). For example, the PSCCH can include a first-stage SCI. A PSCCH resource may start at a first symbol of a slot, and may occupy 1, 2 or 3 symbols. The PSCCH may occupy up to one subchannel with the lowest subcarrier index. FIG. 3 also illustrates symbol(s) that may include PSSCH. The symbols in FIG. 3 that are indicated for PSCCH or PSSCH indicate that the symbols include PSCCH or PSSCH REs. Such symbols corresponding to PSSCH may also include REs that include a second-stage SCI and/or data. At least one symbol may be used for feedback (e.g., PSFCH), as described herein. As illustrated in FIG. 3, symbols 12 and 13 are indicated for PSFCH, which indicates that these symbols include PSFCH REs. In some aspects, symbol 12 of the PSFCH may be a duplication of symbol 13. A gap symbol prior to and/or after the feedback may be used for turnaround between reception of data and transmission of the feedback. As illustrated in FIG. 3, symbol 10 includes a gap symbol to enable turnaround for feedback in symbol 11. Another symbol, e.g., at the end of the slot (symbol 14) may be used as a gap. The gap enables a device to switch from operating as a transmitting device to prepare to operate as a receiving device, e.g., in the following slot. Data may be transmitted in the remaining REs, as illustrated. The data may include the data message described herein. The position of any of the PSCCH, PSSCH, PSFCH, and gap symbols may be different than the example illustrated in FIG. 3.

Figure 4:
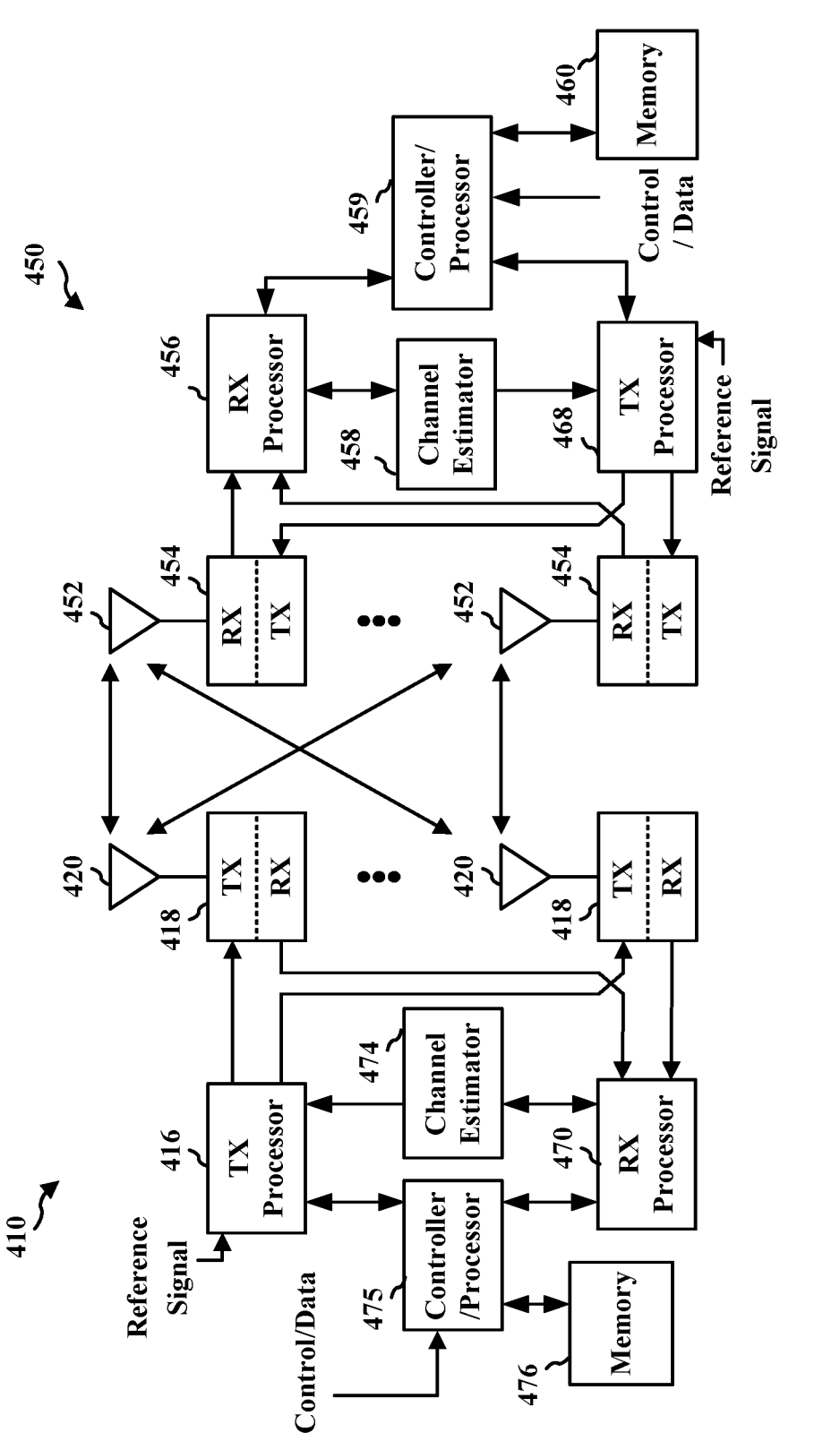
FIG. 4 is a diagram illustrating an example of a base station and user equipment (UE) in an access network.

FIG. 4 is a block diagram of a base station 410 in communication with a UE 450 in an access network. In the DL, IP packets from the EPC 160 may be provided to a controller/processor 475. The controller/processor 475 implements layer 3 and layer 2 functionality. Layer 4 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 475 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 416 and the receive (RX) processor 470 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 416 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 474 may be used to determine the coding and modulation scheme, as well as for spatial processing. The channel estimate may be derived from a reference signal and/or channel condition feedback transmitted by the UE 450. Each spatial stream may then be provided to a different antenna 420 via a separate transmitter 418TX. Each transmitter 418TX may modulate an RF carrier with a respective spatial stream for transmission.

At the UE 450, each receiver 454RX receives a signal through its respective antenna 452. Each receiver 454RX recovers information modulated onto an RF carrier and provides the information to the receive (RX) processor 456. The TX processor 468 and the RX processor 456 implement layer 1 functionality associated with various signal processing functions. The RX processor 456 may perform spatial processing on the information to recover any spatial streams destined for the UE 450. If multiple spatial streams are destined for the UE 450, they may be combined by the RX processor 456 into a single OFDM symbol stream. The RX processor 456 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 410. These soft decisions may be based on channel estimates computed by the channel estimator 458. The soft decisions are then decoded and deinterleaved to recover the data and control signals that were originally transmitted by the base station 410 on the physical channel. The data and control signals are then provided to the controller/processor 459, which implements layer 4 and layer 2 functionality.

The controller/processor 459 can be associated with a memory 460 that stores program codes and data. The memory 460 may be referred to as a computer-readable medium. In the UL, the controller/processor 459 provides demultiplexing between transport and logical channels, packet reassembly, deciphering, header decompression, and control signal processing to recover IP packets from the EPC 160. The controller/processor 459 is also responsible for error detection using an ACK and/or NACK protocol to support HARQ operations.

Similar to the functionality described in connection with the DL transmission by the base station 410, the controller/processor 459 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 458 from a reference signal or feedback transmitted by the base station 410 may be used by the TX processor 468 to select the appropriate coding and modulation schemes, and to facilitate spatial processing. The spatial streams generated by the TX processor 468 may be provided to different antenna 452 via separate transmitters 454TX. Each transmitter 454TX may modulate an RF carrier with a respective spatial stream for transmission.

The UL transmission is processed at the base station 410 in a manner similar to that described in connection with the receiver function at the UE 450. Each receiver 418RX receives a signal through its respective antenna 420. Each receiver 418RX recovers information modulated onto an RF carrier and provides the information to a RX processor 470.

The controller/processor 475 can be associated with a memory 476 that stores program codes and data. The memory 476 may be referred to as a computer-readable medium. In the UL, the controller/processor 475 provides demultiplexing between transport and logical channels, packet reassembly, deciphering, header decompression, control signal processing to recover IP packets from the UE 450. IP packets from the controller/processor 475 may be provided to the EPC 160. The controller/processor 475 is also responsible for error detection using an ACK and/or NACK protocol to support HARQ operations.

At least one of the TX processor 468, the RX processor 456, and the controller/processor 459 may be configured to perform aspects in connection with the dynamic DRX management component 198 of FIG. 1.

At least one of the TX processor 416, the RX processor 470, and the controller/processor 475 may be configured to perform aspects in connection with the dynamic DRX adjustment component 199 of FIG. 1.

A UE may be configured by a base station for a DRX mode at a Uu interface. When there is no data to be transmitted between the UE and base station in either direction, e.g., no uplink or downlink transmissions at the Uu interface, the UE may enter the DRX mode in which the UE may monitor a control channel discontinuously using a sleep and wake cycle. DRX conserves battery power at the UE for improved power efficiency. Without DRX, the UE may monitor the control channel in every slot/subframe to check whether there is data for the UE. Continuous monitoring of the control channel places a demand on the UE's battery power. A sidelink DRX configuration may be configured for a PC5 interface by the network in RRC signaling from a base station, e.g. in an RRC Connection Setup request or an RRC connection reconfiguration request. The sidelink DRX configuration may include the configuration of any of a number of timers and values, e.g., any of a sidelink On duration Timer, a sidelink DRX Inactivity Timer, a sidelink DRX HARQ Retransmission Timer, a value of the sidelink DRX Start Offset, and/or a sidelink DRX Cycle, etc. A sidelink DRX cycle may include a sidelink DRX active duration. The sidelink DRX active duration may refer to a duration of time in which a UE operating as a transmitter is active or a UE operating as a receiver is active. The sidelink DRX cycle also may include a periodic repetition of sidelink on duration in which the UE monitors PSCCH (e.g., SCI-1 and/or SCI-2), and an OFF Duration, which may be referred to as a DRX opportunity. During the OFF duration, the UE does not monitor for PSCCH for scheduling on sidelink. The UE may enter a sleep mode or low power mode in which the UE minimizes power consumption by shutting down a radio frequency (RF) function without detecting communication from the base station.

As an example of a DRX at a Uu interface, a DRX Inactivity Timer may indicate a time, e.g., in terms of TTI duration, after the UE successfully decodes PDCCH when the UE may again enter the OFF Duration. An On duration Timer may indicate an amount of time during which the UE monitors for communication from the base station when the UE wakes up from the OFF duration in DRX Cycle. For example, the On duration Timer may give the number of consecutive PDCCH subframe(s) be monitored/decoded when the UE wakes up from the OFF duration in DRX Cycle. The UE may be considered to be in a DRX active time if at least one associated timer is running (e.g., the DRX On duration Timer, the DRX Inactivity Timer, and/or the DRX Retransmission Timer) and the UE is monitoring for communication from the base station.

In an example of a sidelink DRX at a PC5 interface, a sidelink DRX Inactivity Timer may indicate a time, e.g., in terms of slot or subframe duration, after the UE successfully decodes PSCCH to when the UE may again enter the OFF Duration. A sidelink On duration Timer may indicate an amount of time during which the UE monitors for communication from other UEs on sidelink or PC5 interface when the UE wakes up from the OFF duration in DRX Cycle. For example, the On duration Timer may give the number of consecutive subframe(s) or slot(s) (e.g., physical slot(s) or logical slot(s), where the logical slots are the slots available for sidelink communications with data) be monitored/decoded when the UE wakes up from the OFF duration in DRX Cycle. The UE may be considered to be in a DRX active time if at least one associated timer is running (e.g., the DRX On duration Timer, the DRX Inactivity Timer, and/or the DRX Retransmission Timer or HARQ Retransmission timer) and the UE is monitoring for communication on sidelink (i.e., PC5 interface).

A sidelink DRX may be formed statically for a groupcast or broadcast transmission based on a destination ID or PQI value, and there may not be any message or signaling for UEs to adjust or negotiate a sidelink DRX configuration for a groupcast or broadcast transmission. The statically-configured sidelink DRX for a groupcast or broadcast transmission may not be optimized for more dynamic situations, such as the following situations: (1) aperiodic or spontaneous traffic (e.g., an event triggered burst of data transmissions or message exchanges); (2) system load variation (e.g., more data or message exchanges during the rush hours (i.e., at a time) or at an intersection (i.e., at a location)); and/or (3) UE's capability or preference (e.g., the sidelink DRXs that a UE may support, QoS and power saving requirements, etc.). To further optimize a sidelink DRX configuration and/or a sidelink DRX operation for more dynamic situations may be desirable for meeting both QoS and power saving requirements for groupcast or broadcast transmissions.

The subject technology provides for facilitating sidelink DRX management for broadcast and groupcast transmissions. In some implementations, a transmitter UE may determine one or more adjustments to a sidelink DRX configuration (e.g., on duration, cycle length, on duration offset) or a sidelink DRX operation (e.g., DRX inactivity timer, HARQ RTT time, HARQ retransmission timer) based on one or more factors of the transmitter UE. The transmitter UE may transmit, to a receiver UE over a sidelink channel, during at least a portion of a sidelink DRX active duration, via the transceiver, a first message comprising an indication of the one or more adjustments. In other implementations, a receiver UE may receive, from a transmitter UE to a plurality of UEs over a sidelink channel, during at least a portion of a sidelink DRX active duration, via the transceiver, a first message comprising an indication of one or more first adjustments to a sidelink DRX configuration or a sidelink DRX operation. The receiver UE may determine whether to respond to the indication of the one or more first adjustments to the sidelink DRX configuration based on one or more parameters of the receiver UE. In some implementations, the receiver UE may determine whether to forward or relay the received indication of the one or more first adjustments to the sidelink DRX configuration to other UEs based on one or more parameters of the receiver UE.

Figure 5:
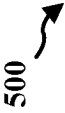
FIG. 5 illustrates an example of sidelink communication between wireless devices, in accordance with one or more of aspects of the present disclosure.

FIG. 5 illustrates an example 500 of sidelink communication between wireless devices. The communication may be based on a slot structure comprising aspects described in connection with FIG. 3 or another sidelink structure. Although the example in FIG. 5 is described for the UEs 502, 504, 506, 508, aspects may be applied to other wireless devices configured for communication based on sidelink, such as an RSU, an IAB node, etc.

As illustrated in FIG. 5, a UE 502 may transmit a sidelink transmission that includes a control information (e.g., sidelink control information (SCI)) and/or a corresponding data channel such as physical sidelink shared channel (PSSCH), that may be received by receiving UEs 504, 506, 508. As illustrated in FIG. 5, the sidelink transmission may be transmitted in a groupcast transmission to each of the UEs 504, 506 and 508 as belong to a common group or different groups. In other aspects, the sidelink transmission may be transmitted in a broadcast transmission to the UEs 504, 506 and 508. The SCI (e.g., SCI-2) may include information for decoding the corresponding data and the SCI (e.g., SCI-1) may also be used by receiving device to avoid interference by refraining from transmitting on the occupied resources during a data transmission. For example, the SCI (e.g., SCI-1) may reserve resources for sidelink communication. The number of slots, as well as the subchannels that will be occupied by the data transmission, may be indicated in SCI (e.g., SCI-1) from the transmitting device. The UEs 502, 504, 506, 508 may each be capable of operating as a transmitting device in addition to operating as a receiving device. Thus, the UEs 506, 508 are illustrated as transmitting transmissions 516 and 518. The transmissions 514, 516 or 518 may be broadcast or groupcast to nearby devices. For example, the UE 502 may transmit communication intended for receipt by other UEs within a required communication range 501 of the UE 502 (e.g., distance-based groupcast or connectionless groupcast). In other examples, the transmissions 514, 516, or 518 may be groupcast to nearby devices that a member of a group (e.g., connection-based groupcast). In other examples, the transmissions 514, 516, or 518 may be unicast from one UE to another UE. In some aspects, the UE 502 may be a group lead for a connection based groupcast. In other aspects, the UE 502 may be a cluster head for distance-based or connectionless groupcast. In other aspects, the UE 502 may be a scheduling UE for managing and/or supporting sidelink communications among the UEs (e.g., UEs 504, 506 or 508) in proximity. Additionally or alternatively, the RSU 507 may receive communication from and/or transmit communication to the UE 508.

The UE 502, 504, 506, 508 and/or the RSU 507 may include a sidelink DRX management component, similar to the dynamic DRX management component 198 described in connection with FIG. 1. The UE 502, 504, 506, 508 and/or the RSU 507 may additionally or alternatively include a sidelink DRX adjustment component, similar to the dynamic DRX adjustment component 199 described in connection with FIG. 1.

Resource allocation refers to how a resource is allocated to a device to use for transmitting a packet. In sidelink communication, resource allocation may be performed in a centralized manner (Mode 1) or a distributed manner (Mode 2). When operating using Mode 1, resource allocations for sidelink communication are determined by a base station. For example, the base station may transmit an indication to a UE that indicates the resources that are allocated to the UE to use to transmit sidelink communication (e.g., sidelink data packets to other UEs). When operating using Mode 2, the resource allocations for sidelink communication are determined by the communicating UE. For example, a transmitting UE may autonomously determine resource allocations for transmitting sidelink control and data to one or more receiving UEs. When operating using Mode 2 (e.g., in a distributed manner), the transmitting UE may determine the resources to use for communicating from a resource pool. A resource pool refers to a collection of time and/or frequency resources on which sidelink communication may occur.

As shown in FIG. 5, a transmitter (Tx) UE 502 and a receiver (Rx) UE 504 may communicate with one another via a sidelink. In some sidelink modes, a base station 102/180 may communicate with the Tx UE 502 via a first access link (not shown). Additionally, or alternatively, in some sidelink modes, the base station 102/180 may communicate with the Rx UE 504 via a second access link (not shown). The Tx UE 502 and/or the Rx UE 504 may correspond to one or more UEs described elsewhere herein, such as the UE 104 of FIG. 1. Thus, a direct link between UEs 104 (e.g., via a PC5 interface) may be referred to as a sidelink, and a direct link between a base station 102/180 and a UE 104 (e.g., via a Uu interface) may be referred to as an access link. Sidelink communications may be transmitted via the sidelink, and access link communications may be transmitted via the access link. An access link communication may be either a downlink communication (from a base station 102/180 to a UE 104) or an uplink communication (from a UE 104 to a base station 102/180).

As described above, the UE 502 may operate in Mode 1, in which resource selection and/or scheduling is performed by the base station 102/180. That is, in Mode 1, the base station 102/180 assigns resources for transmitting sidelink communications. In particular, the base station 102/180 may transmit downlink control information (DCI) (e.g., in DCI format 3_0) that indicates a resource allocation (e.g., time and/or frequency resources) and/or a transmission timing. In Mode 1, a MCS value for sidelink transmissions may be selected by a UE 502 (e.g., within limits set by the base station 102/180). Moreover, Mode 1 may support dynamic grants or configured grants for scheduling sidelink transmissions. The configured grants may be type 1 (e.g., which may be activated by the base station 102/180 via radio resource control (RRC) signaling) or type 2 (e.g., which may be activated by the base station 102/180 via DCI signaling).

As described above, the UE 502 may operate in Mode 2, in which resource selection and/or scheduling is performed by the UE 502. That is, the transmitting UE 502 may autonomously determine resources for sidelink transmissions. In this case, the transmitting UE 502 may perform channel sensing by performing blind decoding of all PSCCH channels in order to determine resources that are reserved for sidelink transmissions (e.g., by other transmitting UEs). In this way, the transmitting UE 502 may determine available resources, which may be reported to an upper layer of the transmitting UE 502 where resource usage is determined. The receiving UE 504 operates according to the same behavior in Mode 1 or Mode 2. In some aspects, the UE 502 may perform resource selection and/or scheduling by sensing channel availability for transmissions. For example, the UE 502 may measure a received signal strength indicator (RSSI) parameter (e.g., a sidelink-RSSI (S-RSSI) parameter) associated with various sidelink channels, may measure a reference signal received power (RSRP) parameter (e.g., a PSCCH-RSRP or PSSCH-RSRP parameter) associated with various sidelink channels, may measure a reference signal received quality (RSRQ) parameter (e.g., a PSSCH-RSRQ parameter) associated with various sidelink channels, and/or the like, and may select a channel for transmission of a sidelink communication based at least in part on the measurement(s).

In some cases, the UE 502 may communicate directly with another UE 504 (or with another group of UEs 506, 508; RSU 507) over a sidelink connection (e.g., using a peer-to-peer (P2P) or D2D protocol). Such communications may be referred to as D2D or sidelink communications, where a first UE 502 may be scheduled (e.g., by a base station 102/180 or another UE 104) to transmit data or control information to a second UE 504 over a sidelink. In some cases, a sidelink may be a communication link or a signal transmitted between different UEs 104 in a network, where one UE 104 may act as a relay for information transmitted by another device.

In the example of the wireless communications system 500, one or more of a group of UEs 104 (e.g., UE 502 and UE 504) may support sidelink communications in addition to direct communication with a base station 102 within the coverage area 501 of base station 102. In such cases, the UEs 502 and 504 may be in-coverage. For example, UE 502 may communicate with the base station 102 via communication link 120, while maintaining sidelink communications over sidelink 230-*a* with the UE 504. In addition, UE 504 may communicate with the base station over communication link 120 while communicating with UE 502 using a sidelink channel. In some in-coverage cases, each UE 104 may be connected to the base station 102 via a direct link (e.g., via a Uu interface).

In the example of wireless communications system 500, one or more of a group of UEs 104 (e.g., UE 508; RSU 507) may support sidelink communication techniques. In the example of FIG. 5, each of the RSU 507 and UE 508 may be outside of the coverage area 501, and may communicate using non-direct links with the base station 102 (e.g., RSU 507, UE 508 may not have an established Uu or RRC connection with base station 102). In other cases, the RSU 507 may be inside the coverage area 501, but may not be able to communicate directly with the bases station 102 (e.g., the RSU 507 may experience interference, reduced signal strength, or otherwise impeded communications). In such cases, the RSU 507 may communicate with the UE 508 using a sidelink channel.

In the example of FIG. 5, the group of UEs 104 may be in partial coverage (e.g., at least one of the UEs may communicate directly with the base station, and at least one other UE may be out of coverage). In such partial-coverage cases, the UE 104 that is in direct communication with the base station (e.g., UE 504) may act as a relay for information transmitted from the base station 102. For example, the UE 504 may receive data or control information directly from the base station 102 via communication link 120, and may relay the information via a sidelink channel to the UE 506. In such cases, the UE 504 may assist communications between the base station 102 and the out of coverage UE 506.

The radio resource allocation for a sidelink communication may be based on resource reservations (e.g., Mode 2). For instance, when a UE is preparing to transmit data on sidelink, the UE may first determine whether resources are reserved by other UEs. Then, the UE may reserve resources from the remaining unreserved resources that are available. The resource allocation for each UE may be in units of one or more subchannels in the frequency domain (e.g., subchannels SC 1 to SC 5), and may be based on one time slot in the time domain. The UE may also use resources in the current slot to perform a first transmission, and may reserve resources in future slots for retransmissions.

Figure 6:
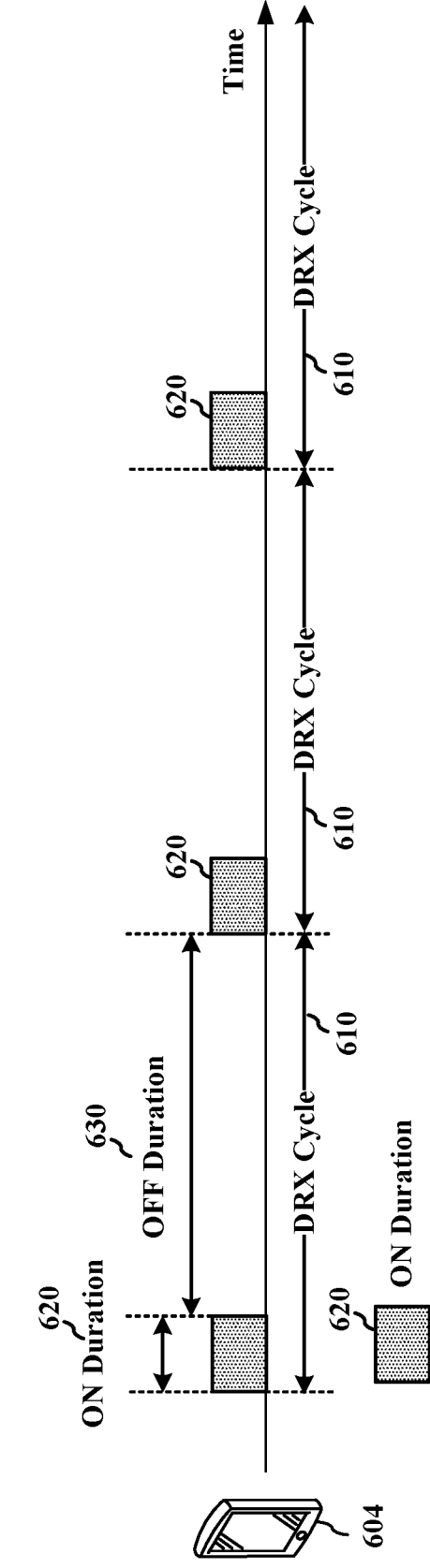
FIG. 6 illustrates example discontinuous reception (DRX) cycles at a Uu interface.

FIG. 6 illustrates an example DRX timeline 600. In the DRX timeline 600, a UE 604 may be configured by a base station (e.g., 102/180) over a Uu interface for DRX, or the UE 604 may be configured by another UE (e.g., 104) over a PC5 interface for sidelink DRX.

When there is no data transmission in either direction (e.g., UL/DL over the Uu interface during an RRC connected state, or sidelink over the PC5 interface), the UE 604 may operate using a DRX mode. In the DRX mode, the UE 604 monitors a control channel (e.g., PDCCH over Uu interface or PSCCH over PC5 interface) discontinuously using a "sleep" and "wake" cycle. DRX conserves battery power at the UE 604. In a non-DRX mode, the UE 604 monitors for the control channel in each subframe to check whether there is downlink data available. Continuous monitoring of the control channel drains a battery power of the UE 604.

The DRX configuration of the UE 604 may be configured by the network using RRC signaling from the base station 102/180, such as in an RRC Connection Setup request or an RRC connection reconfiguration request, or configured by another sidelink UE using sidelink signaling from the sidelink UE. A DRX configuration may include the configuration of one or more timers and values. In some examples, the DRX configuration may include any of an On duration Timer, a DRX Inactivity Timer, a DRX RTT Timer, a DRX Retransmission Timer, a value of the DRX Start Offset, and/or a DRX Cycle, among others. As illustrated in DRX timeline 600, a DRX cycle 610 may include a periodic repetition of an on duration in which the UE 604 monitors for the control channel (e.g., a PDCCH from the base station 102/180 over Uu interface, or a PSCCH from a sidelink UE 104 over PC5 interface) and an off duration 630.

The DRX cycle 610 may include periodic on durations 620 during which the UE monitors for the control channel and off durations 630 during which the UE may not monitor for the control channel. The off duration 630 may be referred to as a DRX opportunity. During the off duration 630, the UE 604 does not monitor for the control channel. The UE 604 may enter a sleep mode or a low power mode in which the UE 604 decreases power consumption by shutting down a RF function without detecting communication from another device (e.g., the base station 102/180 at Uu interface, or a sidelink UE 104 at PC5 interface).

The On duration Timer may correspond to a number of consecutive control channel subframes or slots to be monitored or decoded when the UE 604 wakes up from the off duration 630 in the DRX cycle 610. The DRX Retransmission Timer may correspond to a consecutive number of control channel subframes for the UE 604 to monitor when a retransmission is expected by the UE 604. The DRX Inactivity Timer may correspond to an amount of time before the UE 604 may again enter the off duration 630 following successfully decoding the control channel. The amount of time may be in terms of a TTI duration. After the UE 604 successfully receives data (e.g., downlink data at Uu interface, or sidelink data at PC5 interface), the DRX Inactivity Timer may start counting a number of subframes. If any data transmissions (e.g., uplink/downlink, sidelink) occur while the DRX Inactivity Timer is running, the timer restarts. If the DRX Inactivity Timer expires without data transmission activity, the UE 604 may enter the DRX cycle 610 to achieve power savings.

Figure 7:
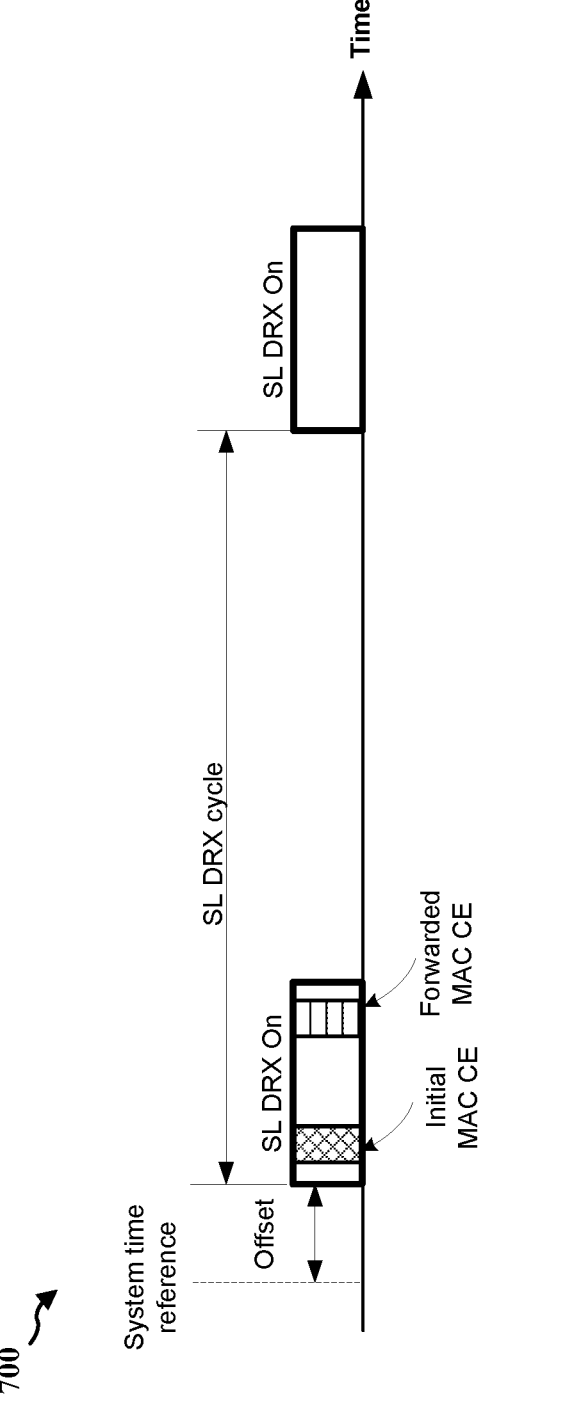
FIG. 7 illustrates an example of a sidelink DRX management technique for adjusting a sidelink DRX configuration dynamically, in accordance with one or more of aspects of the present disclosure.

FIG. 7 illustrates an example of a sidelink DRX management technique 700 for adjusting a sidelink DRX configuration dynamically, in accordance with one or more of aspects of the present disclosure. The sidelink DRX management technique 700 may utilize a MAC CE indication for adjusting a sidelink DRX configuration dynamically. A transmitter UE (Tx UE) may send a MAC CE once (depicted as "Initial MAC CE") or multiple times during a sidelink DRX on duration cycle for adjusting the sidelink DRX configuration (e.g., Offset of On duration, On duration, Cycle length, etc.) dynamically. A receiver UE (Rx UE) may determine a response to the MAC CE indication. Rx UEs may respond with a positive acknowledgment (ACKs) (e.g., for unicast, connection-based groupcast) or no NACKs (e.g., for connection-less groupcast) to the MAC CE and adopt the change accordingly. In other aspects, the Rx UEs may respond with NACKs (e.g., for unicast, connection-based groupcast, or connection-less groupcast) and reject the DRX configuration change. In some implementations, an Rx UE may determine whether to forward the received MAC CE to other sidelink UEs in proximity (depicted as "Forwarded MAC CE") based on one or more of the indication from the Tx UE, the predetermined range from the Tx UE, the current hop number, etc.

FIG. 8 illustrates an example of a sidelink communication 800 between wireless devices of a sidelink DRX management technique for adjusting a sidelink DRX configuration dynamically, in accordance with one or more of aspects of the present disclosure. A MAC CE based sidelink DRX configuration adjustment for a groupcast is exemplified in FIG. 8. In some aspects, UEs (e.g., special UE such as a RSU, group lead, cluster head or a scheduling UE; Tx UE) may be preconfigured (e.g., out-of-network coverage) or configured (e.g., in-network coverage) with a common sidelink DRX configuration for a groupcast communication (denoted as step "1.").

For example, a UE may be configured (or pre-configured) with one or more tables of sidelink DRX configuration with sidelink DRX cycle length and/or sidelink DRX on-duration corresponding to one PQI value or QoS profile, or a group of PQI values or QoS profiles. In other aspects, the UE may be configured (or pre-configured) with index value(s) or code point(s) of one or more specified sidelink DRX configuration tables with sidelink DRX cycle length and/or sidelink DRX on-duration and/or sidelink DRX inactivity timer corresponding to one PQI value or QoS profile or a group of PQI values or QoS profiles (e.g., the packet delay budget (PDB) for defining sidelink DRX cycle length), data rate for defining on-duration, range for distance-based sidelink DRX (e.g., UEs within the range may follow the sidelink DRX configuration). In this regard, the UE may select a suitable sidelink DRX cycle length and/or on-duration based on a PQI value or QoS profile associated with the groupcast or broadcast (e.g., indicated by a destination ID) in which the UE is a participant. In some aspects, if multiple values correspond to multiple PQI values (or QoS profiles) or codepoints of the table, the UE may determine which one is taken (e.g., a longer sidelink DRX cycle length or shorter on-duration is selected for lower priority traffic or for additional power savings; or a shorter sidelink DRX cycle length or longer on-duration is selected for higher priority traffic or for more stringent performance requirements).

Additionally, the UE may determine the sidelink DRX offset (e.g., on duration starting point) using mapping rules based on a service type or a destination ID that are either (pre-)configured or specified. For example, the UE may use an offset mapping table with service types or destination IDs. In another example, the UE may use an offset mapping equation with service types or destination IDs (e.g., a function such as modulo, truncating, hashing, etc.).

In some examples, the table of a sidelink DRX configuration may contain value(s) for Inactivity timer, and/or HARQ retransmission timer corresponding to different PQI values or QoS profiles (e.g., data rate, priority, etc.) for different cast types.

In some aspects, a special UE (e.g., RSU, cluster head, group lead, scheduling UE, etc.) may decide to adjust the sidelink DRX configuration (e.g., change the DRX Offset to avoid overlapping with other sidelink DRX on duration; extend the on duration timer or select a different on duration from the sidelink DRX configuration table due to system loading; change the DRX cycle length or select a different DRX cycle length from the sidelink DRX configuration table due to traffic pattern changes) or decide to adjust the sidelink DRX timer values or select different timer values from the sidelink DRX configuration table for sidelink UEs in proximity or a cluster of sidelink UEs or a group of sidelink UEs. In other aspects, a Tx UE may decide to adjust the sidelink DRX configuration (e.g., extend the DRX on duration based on its buffer status, or adjust the DRX cycle length due to a latency requirement associated with the data transmissions from the Tx UE) for its transmission(s) (denoted as step "2.").

The special UE or Tx UE may send a MAC CE indication once or multiple times (e.g., repetitions) via a groupcast transmission at earliest available occasion(s) within the common sidelink DRX on duration to signal the adjustment to the common sidelink DRX configuration (denoted as step "3."). In some aspects, the MAC CE indication may contain one or more fields that indicate the adjustment to the common configuration such as offset, on duration, cycle length, timer values (e.g., inactivity timer value, HARQ RTT timer value and/or HARQ retransmission timer value, or if a configured timer value can be overwritten by the indications in SCI (e.g., retransmission reservation or periodic transmission reservation), etc. In some aspects, the MAC CE indication may contain one or more fields that indicate the starting time and/or duration for such adjustment. In some aspects, the MAC CE indication may contain one or more fields that indicate whether the adjustment is mandatory or negotiable between the Tx UE and Rx UE(s). In some aspects, the MAC CE indication may contain one or more fields that indicate whether the adjustment is range based (e.g., including a predetermined range requirement and a location of the special UE or Tx UE). In some aspects, the MAC CE indication may contain one or more fields that indicate whether the indication can be forwarded to other sidelink UEs. In some aspects, the MAC CE indication may contain one or more fields that indicate a predetermined maximum range and/or maximum hop number if the MAC CE is forwardable.

In some aspects, an Rx UE may decide to respond to the MAC CE indication of the DRX configuration adjustment based on whether the adjustment is mandatory or negotiable as indicated in the MAC CE (denoted as step "4."). In some aspects, the Rx UE may respond based on the Rx UE's location or distance between the Rx UE and the special UE or Tx UE. For example, if the Rx UE is within (or does not exceed) a maximum distance range from the Tx UE, then the Rx UE may decide to respond. In other aspects, the Rx UE may respond based on the Rx UE's current sidelink DRX configurations, QoS requirements, or power saving requirements. In some aspects, the Rx UE(s) may respond with an ACK or no-NACK for implicitly accepting the DRX configuration adjustment, or a NACK for implicitly rejecting the MAC CE (denoted as step "5A."). In other aspects, the Rx UE may respond with an ACK to receiving the MAC CE (denoted as step "5B."), but may send a MAC CE for the Rx UE's information with a suitable sidelink DRX adjustment to assist the Tx UE or provide a rejection reason with the Rx UE's preferences for DRX configuration (denoted as step "5C.").

In some aspects, the Rx UE(s) may decide whether to forward the MAC CE based on one or more factors (denoted as step "6."). In some aspects, the Rx UE may decide to forward the indication based on a forwardable indication from the special UE or Tx UE via the MAC CE. In some aspects, the Rx UE may decide to forward the indication based on whether a current hop count is lesser than a maximum hop count or whether the hopping range is lesser than a maximum range as indicated by the special UE or Tx UE via the MAC CE. In some aspects, the Rx UE may decide to forward the indication based on whether the current location of the Rx UE is outside of the range requirement (e.g., the distance between the special UE or Tx UE and the Rx UE is lesser than the predetermined maximum range). In some aspects, the Rx UE may decide to forward the indication based on whether any data is available to multiplex with the MAC CE. In some aspects, the Rx UE may decide to forward the indication based on whether the MAC CE can be sent alone while no data is available (e.g., based on the priority of the MAC CE). In some aspects, the Rx UE may decide to forward the indication based on whether any response from other sidelink UEs in proximity to the Tx UE detected by the Rx UE. In some aspects, the Rx UE may decide to forward the indication based on when to forward the MAC CE to avoid unnecessary forwarding. In some aspects, the Rx UE may decide to forward the indication based on system loading or channel congestion level (e.g., based on channel busy ratio (CBR)).

If the Rx UE decides to forward the indication (denoted as step "7."), the Rx UE(s) may forward the MAC CE during the common on duration at the occasion determined. For example, the occasion may be determined based on sensing available resources, detecting forwarded MAC CE from other UEs, measurement of the channel congestion, remaining time of the on duration, etc.

In some aspects, the special UE or Tx UE may decide whether any further adjustment to the sidelink DRX configuration is needed (denoted as step "8."). In some aspects, the Tx UE may determine to further adjust the sidelink DRX configuration or not based on whether the Tx UE received ACKs from all Rx UEs (e.g., for connection based groupcast) or received no NACK from Rx UEs (e.g., for connection-less groupcast) for implicitly accepting the sidelink DRX configuration adjustments. In some aspects, the Tx UE may determine to further adjust the sidelink DRX configuration based on whether the Tx UE received a MAC CE with the Rx UE's assistance information or rejection reasoning.

If the Tx UE determines to further adjust the sidelink DRX configuration, the special UE or Tx UE may send a second MAC CE with the adjusted sidelink DRX configuration (denoted as step "9."). In some aspects, the Tx UE may send the second MAC CE to activate or confirm the adjustment, if needed. In some aspects, the Tx UE may perform a second run with the adjustment based on Rx UEs feedback (back to step 3). In one or more aspects, the special UE or Tx UE determines the final decision if the negotiation between the Tx UE and Rx UE may not be converged.

FIG. 9 illustrates another example of a sidelink communication 900 between wireless devices of a sidelink DRX management technique for adjusting a sidelink DRX configuration dynamically, in accordance with one or more aspects of the present disclosure. A MAC CE based sidelink DRX configuration adjustment for a broadcast is exemplified in FIG. 9. In some aspects, UEs (e.g., special UE, Tx UE) may be preconfigured (e.g., out-of-network coverage)

or configured (e.g., in-network coverage) with a common sidelink DRX configuration for a broadcast communication (denoted as step "1.").

For example, a UE may be configured (or pre-configured) with one or more tables of sidelink DRX configuration with sidelink DRX cycle length and/or sidelink DRX on-duration corresponding to one PQI value or QoS profile, or a group of PQI values or QoS profiles. In other aspects, the UE may be configured (or pre-configured) with index value(s) or code point(s) of one or more specified sidelink DRX configuration tables with sidelink DRX cycle length and/or sidelink DRX on-duration corresponding to one PQI value or QoS profile or a group of PQI values or QoS profiles (e.g., the packet delay budget (PDB) for defining sidelink DRX cycle length), data rate for defining on-duration, range for distance-based sidelink DRX (e.g., UEs within the range may follow the sidelink DRX configuration). In this regard, the UE may select a suitable sidelink DRX cycle length and/or on-duration based on a PQI value or QoS profile associated with the groupcast or broadcast (e.g., indicated by a destination ID) in which the UE is a participant. In some aspects, if multiple values correspond to multiple PQI values (or QoS profiles) or codepoints of the table, the UE may determine which one is taken (e.g., a longer sidelink DRX cycle length or shorter on-duration is selected for lower priority traffic or for additional power savings; or a shorter sidelink DRX cycle length or longer on-duration is selected for higher priority traffic or for more stringent performance requirements).

Additionally, the UE may determine the sidelink DRX offset (e.g., on duration starting point) using mapping rules based on a service type or a destination ID that are either (pre-)configured or specified in real time. For example, the UE may use an offset mapping table with service types or destination IDs. In another example, the UE may use an offset mapping equation with service types or destination IDs (e.g., a function such as modulo, truncating, hashing, etc.).

In some examples, the table of a sidelink DRX configuration may contain value(s) for Inactivity timer, and/or HARQ retransmission timer corresponding to different PQI values or QoS profiles (e.g., data rate, priority, etc.) for different cast types.

In some aspects, a special UE (e.g., RSU, cluster head, scheduling UE, etc.) may decide to adjust the sidelink DRX configuration (e.g., change the DRX Offset to avoid overlapping with other sidelink DRX on duration timer; extend the on duration timer or select a different on duration from the sidelink DRX configuration table due to system loading; change the DRX cycle length or select a different DRX cycle length from the sidelink DRX configuration table due to traffic pattern changes) or decide to adjust the sidelink DRX timer values or select different values from the sidelink DRX configuration table for sidelink UEs in proximity or a cluster of sidelink UEs. In other aspects, a Tx UE may decide to adjust the sidelink DRX configuration (e.g., extend the DRX on duration based on its buffer status, or adjust the DRX cycle length due to a latency requirement associated with the data transmissions from the Tx UE) for its transmission(s) (denoted as step "2.").

The special UE or Tx UE may send a MAC CE indication once or multiple times (e.g., repetitions) via a broadcast transmission at earliest available occasion(s) within the common sidelink DRX on duration to signal the adjustment to the common sidelink DRX configuration (denoted as step "3."). In some aspects, the MAC CE indication may contain one or more fields that indicate the adjustment to the common configuration such as offset, on duration, cycle length, timer values (e.g., inactivity timer value, HARQ RTT timer value and/or HARQ retransmission timer value, etc.). In some aspects, the MAC CE indication may contain one or more fields that indicate the starting time and/or duration for such adjustment. In some aspects, the MAC CE indication may contain one or more fields that indicate whether the adjustment is mandatory or negotiable between the Tx UE and Rx UE(s). In some aspects, the MAC CE indication may contain one or more fields that indicate whether the adjustment is range based (e.g., including a predetermined range requirement and a location of the special UE or Tx UE). In some aspects, the MAC CE indication may contain one or more fields that indicate whether the indication can be forwarded to other sidelink UEs. In some aspects, the MAC CE indication may contain one or more fields that indicate a predetermined maximum range and/or maximum hop number if the MAC CE is forwardable.

FIG. 10 illustrates an example of a sidelink DRX management technique 1000 for adjusting a sidelink DRX operation dynamically, in accordance with one or more of aspects of the present disclosure. The sidelink DRX management technique 1000 may utilize a MAC command indication for adjusting a sidelink DRX operation dynamically. A transmitter UE (Tx UE) may send a MAC command once (depicted as "Initial MAC Command") or multiple times during a sidelink DRX on duration cycle for adjusting sidelink DRX timer values or timer operations dynamically. A receiver UE (Rx UE) may determine a response to the MAC command indication. Rx UEs may respond with a positive acknowledgment (ACKs) or no NACKs to the MAC command and set and operate the timers accordingly. In other aspects, the Rx UEs may respond with NACKs and reject the DRX operation change. In some implementations, an Rx UE may determine whether to forward the received MAC command to other sidelink UEs in proximity (depicted as "Forwarded MAC Command") based on one or more of the indication from the Tx UE, the predetermined range from the Tx UE, the current hop number, etc.

Figure 11:
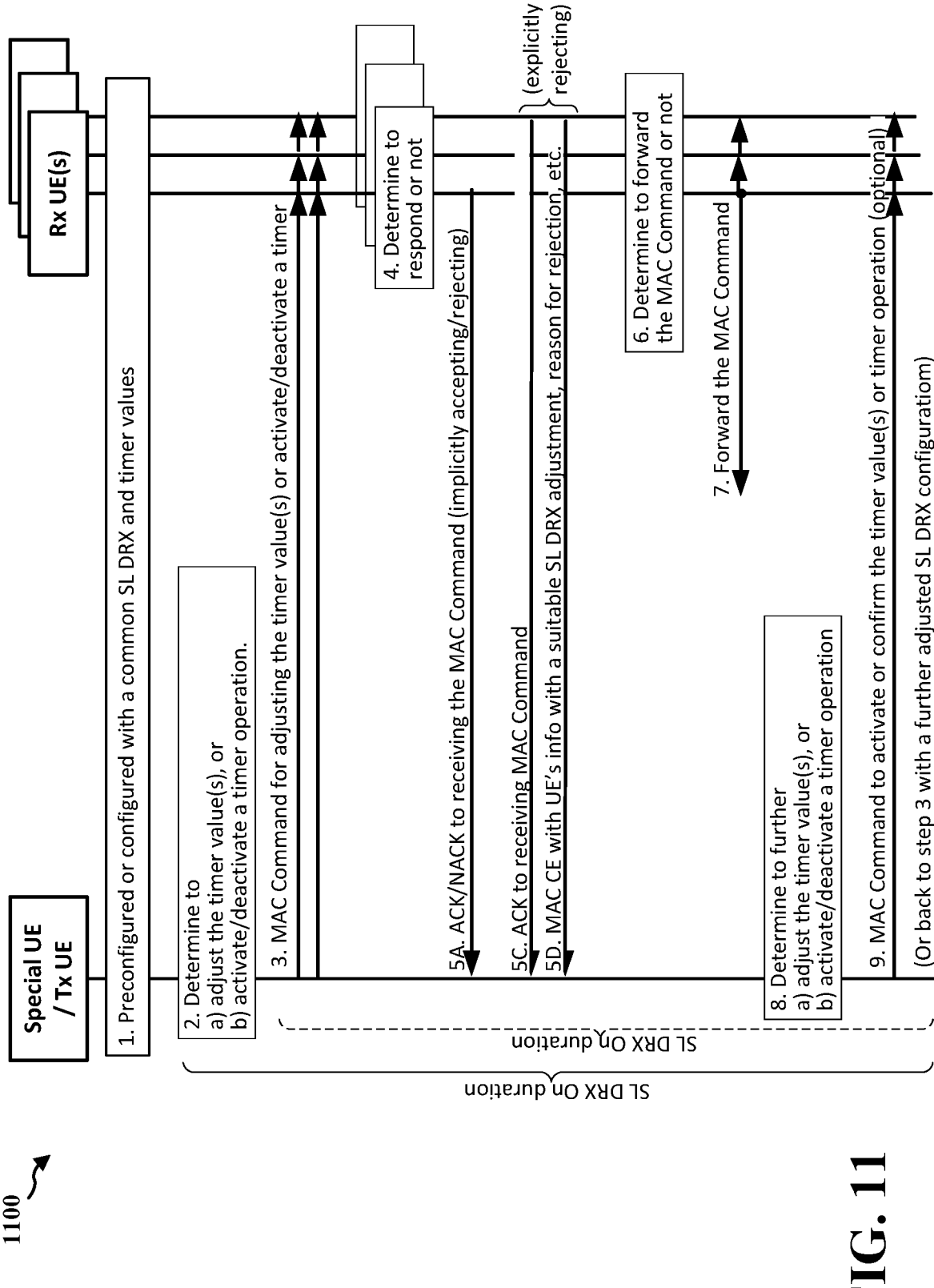
FIG. 11 illustrates an example of a sidelink communication between wireless devices of a sidelink DRX management technique for adjusting a sidelink DRX operation dynamically, in accordance with one or more of aspects of the present disclosure.

FIG. 11 illustrates an example of a sidelink communication between wireless devices of a sidelink DRX management technique for adjusting a sidelink DRX operation dynamically, in accordance with one or more of aspects of the present disclosure. A MAC command based sidelink DRX operation adjustment for a groupcast is exemplified in FIG. 11. In some aspects, UEs (e.g., special UE, Tx UE) may be preconfigured (e.g., out-of-network coverage) or configured (e.g., in-network coverage) with a common sidelink DRX configuration. In other aspects, UEs may determine a common sidelink DRX configuration using a PQI and/or a destination ID as described previously for FIG. 8 and the UEs may accordingly set sidelink DRX timer values and operations for a groupcast or broadcast communication (denoted as step "1.").

Figure 13:
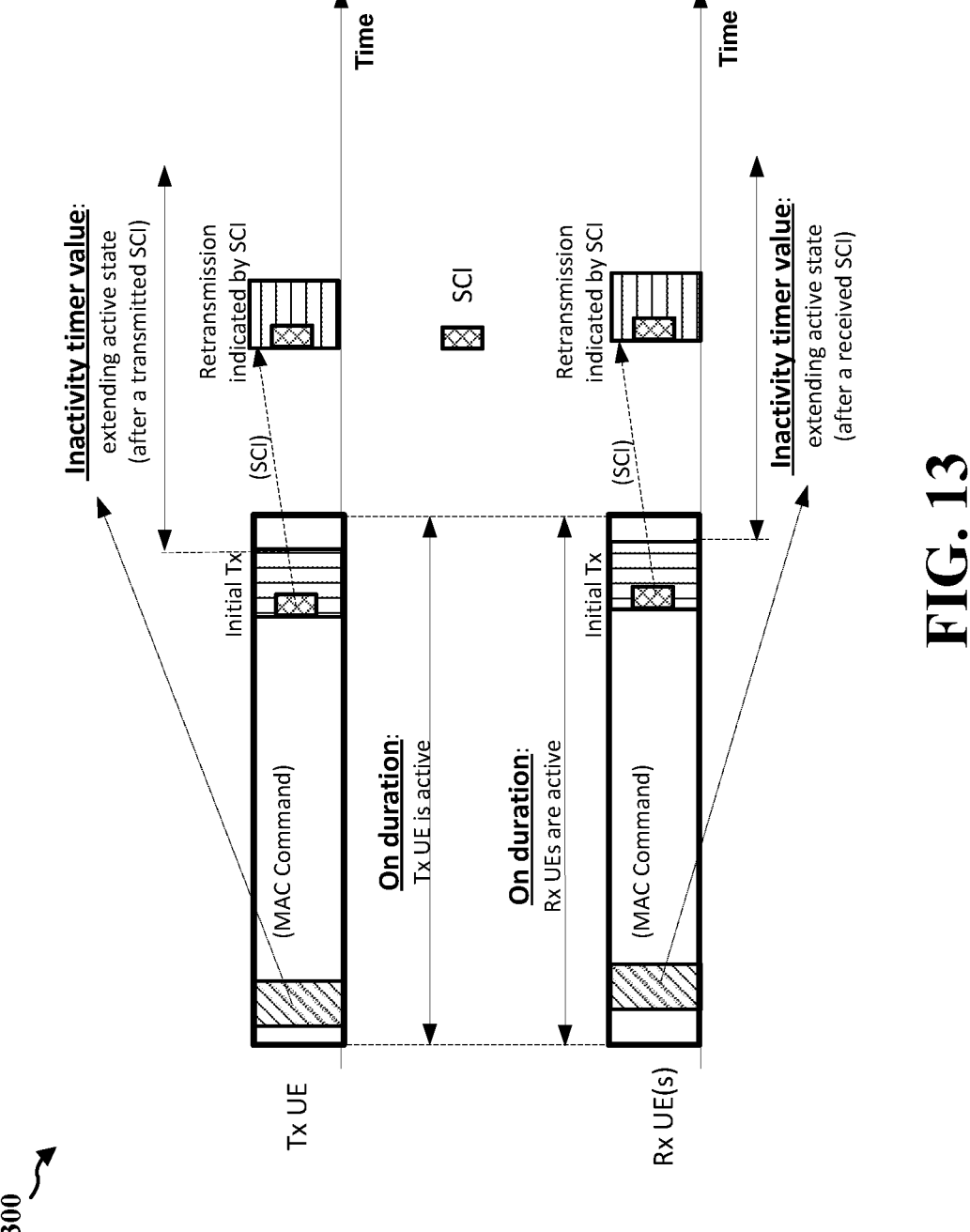
FIG. 13 illustrates an example of a sidelink DRX management technique for adjusting a sidelink DRX inactivity timer value, in accordance with one or more of aspects of the present disclosure.
Figure 14:
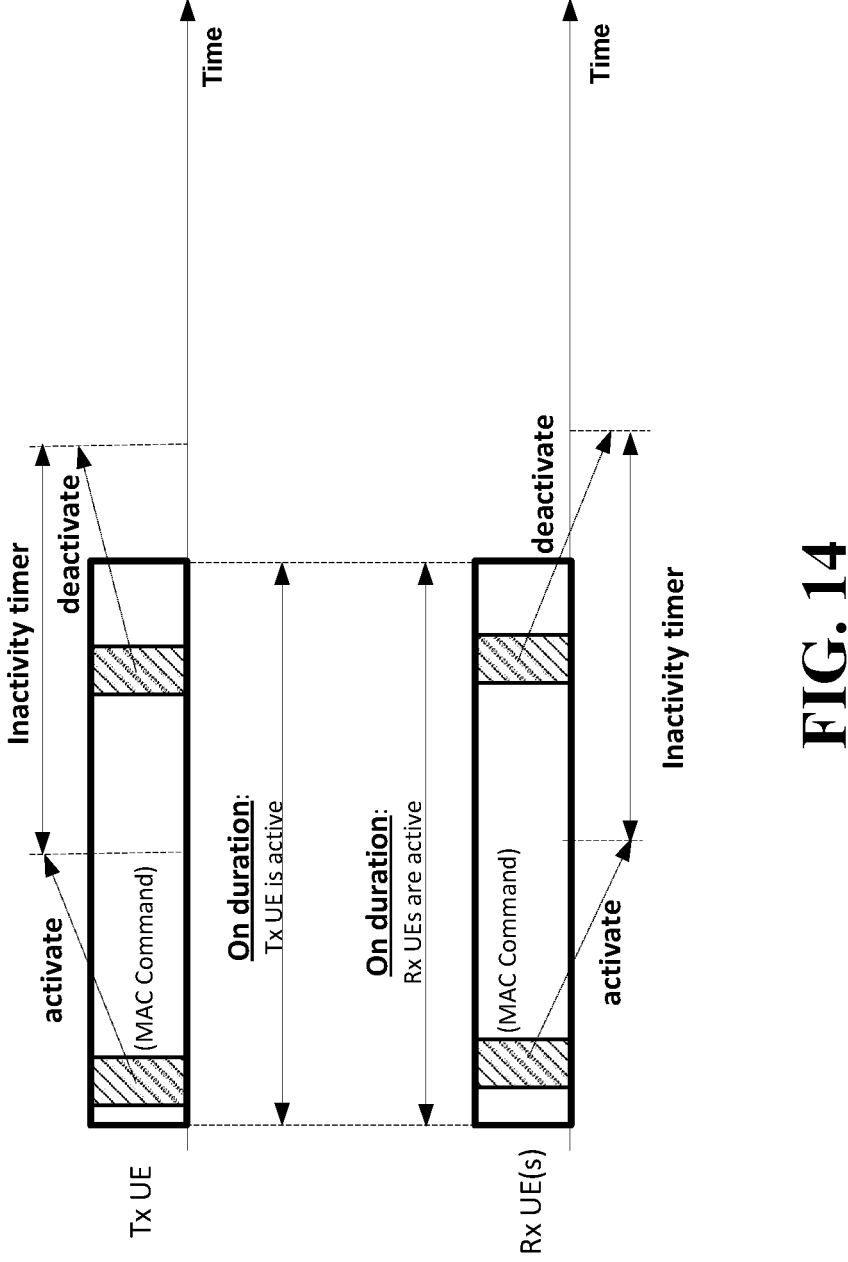
FIG. 14 illustrates an example of a sidelink DRX management technique for adjusting a sidelink DRX inactivity timer operation, in accordance with one or more of aspects of the present disclosure.
Figure 15:
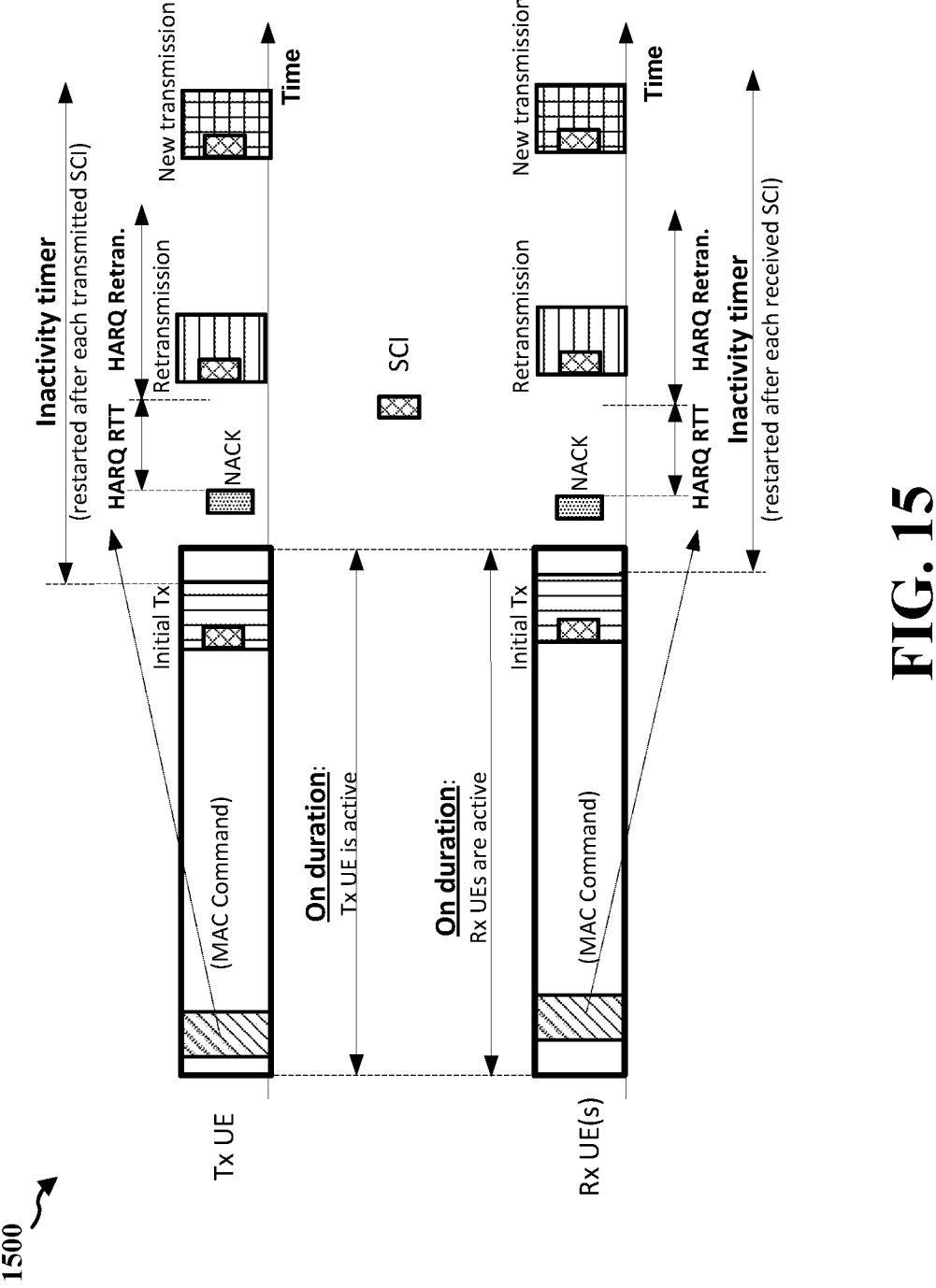
FIG. 15 illustrates an example of a sidelink DRX management technique for adjusting a hybrid automatic repeat request round trip time timer, in accordance with one or more of aspects of the present disclosure.

In some aspects, a special UE (e.g., RSU, cluster head, group lead, scheduling UE, etc.) may decide to adjust the sidelink DRX timer values (e.g., change the values for Inactivity timer as shown in FIG. 13 (where FIG. 13 illustrates an example of a sidelink DRX management technique 1300 for adjusting a sidelink DRX inactivity timer value, in accordance with one or more of aspects of the present disclosure), HARQ RTT timer and HARQ retransmission timer as shown in FIG. 15 if enabled for groupcast, etc.) or timer operations (e.g., activate or deactivate Inactivity timer operation as shown in FIG. 14 (where FIG. 14 illustrates an example of a sidelink DRX management technique 1400 for adjusting a sidelink DRX inactivity timer operation, in accordance with one or more of aspects of the present disclosure), activate or deactivate HARQ retransmission timer operation with or without HARQ RTT timer as shown in FIG. 15 (where FIG. 15 illustrates an example of a sidelink DRX management technique 1500 for adjusting a sidelink DRX HARQ retransmission timer operation, in accordance with one or more of aspects of the present disclosure), enable a new TB transmission or not while Inactivity timer is running (e.g., Inactivity timer is restarted after each received SCI) as shown in FIG. 15 (where the sidelink DRX management technique 1500 of FIG. 15 also includes adjustment to a HARQ RTT timer), allowing an Rx UE to end active state after a successful decoding of a TB while Inactivity timer is running, etc.) for sidelink UEs in proximity or a cluster of sidelink UEs or a group of sidelink UEs (denoted as step "2."). In other aspects, a Tx UE may decide to adjust the sidelink DRX timer values or timer operations based on its data transmission requirement or status, such as priority, remaining PDB or latency requirement, burst of data transmission or current buffer status.

The special UE or Tx UE may send a MAC command indication once or multiple times (e.g., repetitions) via a groupcast transmission at an earliest available occasion within the common sidelink DRX on duration period to signal the adjustment to the common sidelink DRX timer values or timer operations (denoted as step "3."). The MAC command may indicate the timer and the adjusted value(s) (e.g., on duration timer, inactivity timer, HARQ RTT timer, HARQ retransmission timer, etc.), and whether this value can be overridden by SCI indication (e.g., inactivity timer). In some aspects, the MAC command indication may contain one or more fields that indicate the adjustment to the common configuration such as offset, on duration, cycle length, etc. In some aspects, the MAC command indication may contain one or more fields that indicate the starting time and/or duration for such adjustment. In some aspects, the MAC command indication may contain one or more fields that indicate whether the adjustment is mandatory or negotiable between the Tx UE and Rx UE. In some aspects, the MAC command indication may contain one or more fields that indicate whether the adjustment is range based (e.g., including a predetermined range requirement and a location of the special UE or Tx UE. In some aspects, the MAC command indication may contain one or more fields that indicate whether the indication can be forwarded to other sidelink UEs. In some aspects, the MAC command indication may contain one or more fields that indicate a predetermined maximum range and/or maximum hop number if the indication is forwardable.

In some aspects, an Rx UE may decide to respond to the indication of the DRX operation adjustment based on whether the adjustment is mandatory or negotiable as indicated in the MAC command (denoted as step "4."). In some aspects, the Rx UE may respond based on the Rx UE's location or distance between the Rx UE and the special UE or Tx UE. For example, if the Rx UE is within (or does not exceed) a maximum distance range from the Tx UE, then the Rx UE may decide to respond. In other aspects, the Rx UE may respond based on the Rx UE's current sidelink DRX operations, QoS requirements, or power saving requirements. In some aspects, the Rx UE(s) may respond with an ACK or no-NACK for implicitly accepting the DRX operation adjustment, or a NACK for implicitly rejecting the MAC command (denoted as step "5A."). In other aspects, the Rx UE may respond with an ACK to receiving the MAC command (denoted as step "5B."), but may send a MAC CE for the Rx UE's information with a suitable sidelink DRX adjustment to assist the Tx UE or provide a rejection reason with the Rx UE's preferences for DRX operation (denoted as step "5C.").

In some aspects, the Rx UE(s) may decide whether to forward the MAC command based on one or more factors (denoted as step "6."). In some aspects, the Rx UE may decide to forward the indication based on a forwardable indication from the special UE or Tx UE via the MAC command. In some aspects, the Rx UE may decide to forward the indication based on whether a current hop count is lesser than a maximum hop count or whether the hopping range is lesser than a maximum range as indicated by the special UE or Tx UE via the MAC command. In some aspects, the Rx UE may decide to forward the indication based on whether the current location of the Rx UE is outside of the range requirement (e.g., the distance between the special UE or Tx UE and the Rx UE is lesser than the predetermined maximum range). In some aspects, the Rx UE may decide to forward the indication based on whether any data is available to multiplex with the MAC command. In some aspects, the Rx UE may decide to forward the indication based on whether the MAC command can be sent alone while no data is available (e.g., based on the priority of the MAC command). In some aspects, the Rx UE may decide to forward the indication based on whether any response from other sidelink UEs in proximity to the Tx UE detected by the Rx UE has been received. In some aspects, the Rx UE may decide to forward the indication based on when to forward the MAC command to avoid unnecessary forwarding. In some aspects, the Rx UE may decide to forward the indication based on system loading or channel congestion level (e.g., based on CBR).

If the Rx UE decides to forward the indication (denoted as step "7."), the Rx UE(s) may forward the MAC command during the common on duration at the occasion determined. For example, the occasion may be determined based on sensing available resources, detecting forwarded MAC command from other UEs, measurement of the channel congestion, remaining time of the on duration, etc.

In some aspects, the special UE or Tx UE may decide whether any further adjustment to the sidelink DRX operation is needed (denoted as step "8."). In some aspects, the Tx UE may determine to further adjust the sidelink DRX operation or not based on whether the Tx UE received ACKs from all Rx UEs (e.g., for connection based groupcast) or received no NACK from Rx UEs (e.g., for connection-less groupcast) for implicitly accepting the sidelink DRX operation adjustments. In some aspects, the Tx UE may determine to further adjust the sidelink DRX operation based on whether the Tx UE received a MAC CE with the Rx UE's assistance information or rejection reasoning.

If the Tx UE determines to further adjust the sidelink DRX operation, the special UE or Tx UE may send a second MAC command with the adjustment(s) (denoted as step "9."). In some aspects, the Tx UE may send the second MAC command or MAC CE to activate or confirm the further adjustment, if needed. In some aspects, the Tx UE may perform a second run with the adjustment based on Rx UEs feedback (back to step 3). In one or more aspects, the special UE or Tx UE determines the final decision if the negotiation between the Tx UE and Rx UE may not be converged.

Figure 12:
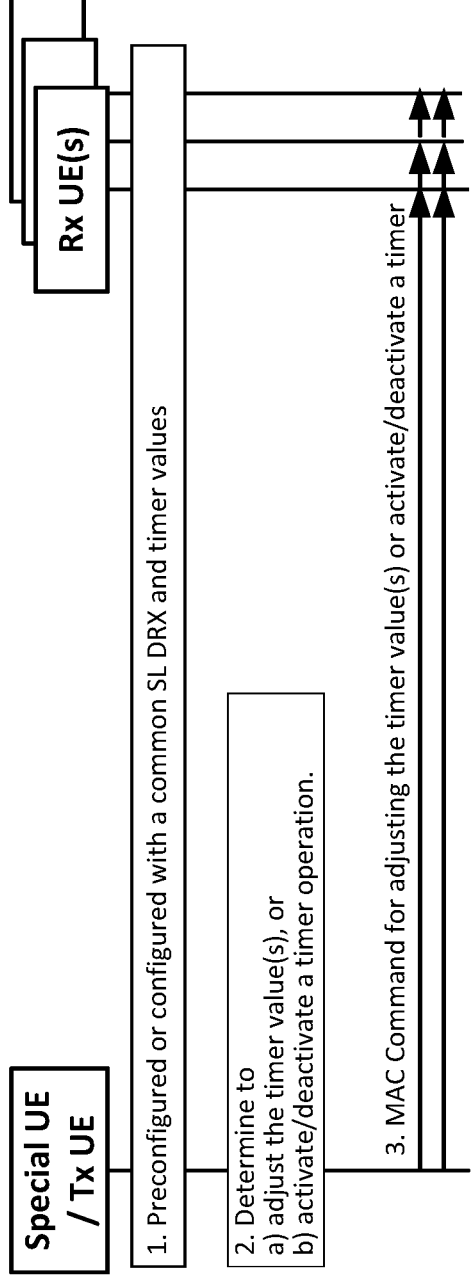
FIG. 12 illustrates another example of a sidelink communication between wireless devices of a sidelink DRX management technique for adjusting a sidelink DRX operation dynamically, in accordance with one or more of aspects of the present disclosure.

FIG. 12 illustrates another example of a sidelink communication between wireless devices of a sidelink DRX management technique for adjusting a sidelink DRX operation dynamically, in accordance with one or more of aspects of the present disclosure. A MAC command based sidelink DRX operation adjustment for a broadcast is exemplified in FIG. 12. In some aspects, UEs (e.g., special UE, Tx UE) may be preconfigured (e.g., out-of-network coverage) or configured (e.g., in-network coverage) with a common sidelink DRX configuration. In other aspects, the UEs may determine a common sidelink DRX configuration using PQI and/or destination ID as described previously for FIG. 8 and the UEs may accordingly set sidelink DRX timer values and operations for a broadcast communication (denoted as step "1.").

In some aspects, a special UE (e.g., RSU, cluster head, scheduling UE, etc.) may decide to adjust the sidelink DRX timer values (e.g., changing the value for Inactivity timer as shown in FIG. 13; changing the value for HARQ RTT timer and/or HARQ retransmission timer as shown in FIG. 15 if HARQ RTT timer or HARQ retransmission timer is enabled for groupcast, etc.) or timer operations (e.g., activating the Inactivity timer operation during the on duration or deactivating the Inactivity timer operation in or out of the on duration while the Inactivity timer is running as shown in FIG. 14; activating or deactivating HARQ retransmission timer operation with or without HARQ RTT timer as shown in FIG. 15; enabling a new TB transmission or not while Inactivity timer is running where the Inactivity timer is restarted after each received SCI with an initial transmission as shown in FIG. 15 that allows an Rx UE to end active state after a successful decoding of a TB if a new TB transmission is disabled while Inactivity timer is running, etc.) for sidelink UEs in proximity or a cluster of sidelink UEs (denoted as step "2."). In other aspects, a Tx UE may decide to adjust the sidelink DRX timer values or timer operations based on its data transmission requirement or status, such as priority, remaining PDB or latency requirement, burst of data transmission or current buffer status.

The special UE or Tx UE may send a MAC command indication once or multiple times (e.g., repetitions) via a broadcast transmission at an earliest available occasion within the common sidelink DRX on duration period to signal the adjustment to the common sidelink DRX timer values or timer operations (denoted as step "3."). The MAC command may indicate the timer and the adjusted value(s) (e.g., on duration timer, inactivity timer, HARQ RTT timer, HARQ retransmission timer, etc.), and whether this value can be overridden by SCI indication (e.g., inactivity timer). In some aspects, the MAC command indication may contain one or more fields that indicate the adjustment to the common configuration such as offset, on duration, cycle length, etc. In some aspects, the MAC command indication may contain one or more fields that indicate the starting time and/or duration for such adjustment. In some aspects, the MAC command indication may contain one or more fields that indicate whether the adjustment is mandatory or negotiable between the Tx UE and Rx UE. In some aspects, the MAC command indication may contain one or more fields that indicate whether the adjustment is range based (e.g., including a predetermined range requirement and a location of the special UE or Tx UE. In some aspects, the MAC command indication may contain one or more fields that indicate whether the indication can be forwarded to other sidelink UEs. In some aspects, the MAC command indication may contain one or more fields that indicate a predetermined maximum range and/or maximum hop number if the indication is forwardable.

FIG. 16 is a flowchart 1600 illustrating a process of wireless communication that supports sidelink DRX management of a sidelink DRX configuration at a transmitter UE in accordance with some aspects of the present disclosure. The process may be performed by a UE (e.g., UE 104, 350).

As illustrated, the flowchart 1600 includes a number of enumerated steps, but embodiments of the flowchart 1600 may include additional steps before, after, and in between the enumerated steps. In some embodiments, one or more of the enumerated steps may be omitted or performed in a different order. Optional aspects are illustrated with a dashed line.

At 1602, the UE may determine one or more adjustments to a sidelink discontinuous reception (DRX) configuration based on one or more factors of the transmitter UE. In the context of FIGS. 1, 5, 6 and 10-15, for example, the UE 104 may determine the sidelink DRX configuration adjustments. For instance, 1602 may be performed by one or more components described with respect to FIG. 4, e.g., controller/processor 459. The one or more adjustments to the DRX configuration may be determined, e.g., by the determination component 2040 through coordination with the DRX configuration adjustment component 2042 of the apparatus 2002 in FIG. 20.

At 1604, the UE may transmit, to a receiver UE over a sidelink channel, during at least a portion of a sidelink DRX active duration, via the transceiver, a first message comprising an indication of the one or more adjustments to the sidelink DRX configuration. In some aspects, the at least a portion of the sidelink DRX active duration includes an on duration period. In other aspects, the at least a portion of the sidelink DRX active duration corresponds to the on duration period. In some aspects, the UE may transmit, via the transceiver, a single instance of the MAC CE at a particular time within the on duration period. In other aspects, the UE may transmit, via the transceiver, a plurality of repetitions of the MAC CE at respective times within the on duration period. In the context of FIGS. 1, 5, 6 and 10-15, for example, the UE 104 may transmit the indication of the sidelink DRX configuration adjustments. In some aspects, the first message includes a MAC CE, wherein the indication of the one or more adjustments to the sidelink DRX configuration is included in the MAC CE. In some aspects, the one or more first adjustments to the sidelink DRX configuration correspond to one or more of an adjustment to a DRX offset value, an adjustment to the at least a portion of the sidelink DRX active duration or an adjustment to a length of the sidelink DRX active duration. In some aspects, the UE may transmit, to a plurality of UEs over the sidelink, via the transceiver, the first message in a groupcast transmission. In some aspects, the indication indicates whether the one or more first adjustments to the sidelink DRX configuration are negotiable between the transmitter UE and the receiver UE. In some aspects, the indication indicates whether the receiver UE is allowed to forward the indication to a third UE over a sidelink channel. In other aspects, the indication indicates whether the one or more first adjustments to the sidelink DRX configuration are applicable to the receiver UE based on a location of the transmitter UE and a predetermined range criteria. For instance, 1604 may be performed by one or more components described with respect to FIG. 4, e.g., controller/processor 459, transmit processor 468, receiver/transmitter 454 and/or antenna 452. The first message may be transmitted, e.g., by the DRX configuration adjustment component 2042 via the transmission component 2034 of the apparatus 2002 in FIG. 20.

At 1606, the UE may receive, from the receiver UE over the sidelink channel, via the transceiver, a second message comprising a response indicating whether the receiver UE accepts the one or more first adjustments to the sidelink DRX configuration. In the context of FIGS. 1, 5, 6 and 10-15, for example, the UE 104 may receive the response from the receiver UE. For instance, 1606 may be performed by one or more components described with respect to FIG. 4, e.g., controller/processor 459, receive processor 456, receiver/transmitter 454 and/or antenna 452. The second message may be received, e.g., by the adjustment processing component 2048 via the reception component 2030 of the apparatus 2002 in FIG. 20.

At 1608, the UE may determine whether the receiver UE accepted the one or more first adjustments to the sidelink DRX configuration. If the receiver UE accepted the adjustments, then the process proceeds to block 1610. In some aspects, the response comprises a positive acknowledgment message indicating an acceptance to the one or more first adjustments to the sidelink DRX configuration. Otherwise, the process proceeds to block 1612. In some aspects, the response includes a negative acknowledgment message indicating that the receiver UE does not accept the one or more first adjustments to the sidelink DRX configuration. In the context of FIGS. 1, 5, 6 and 10-15, for example, the UE 104 may perform the operation to determine whether the receiver UE accepted the sidelink DRX configuration adjustments. For instance, 1608 may be performed by one or more components described with respect to FIG. 4, e.g., controller/processor 459. The determination of whether the receiver UE accepted the one or more adjustments to the DRX configuration may be performed, e.g., by the determination component 2040 of the apparatus 2002 in FIG. 20.

In some aspects, the response includes a MAC CE that includes content indicating a rejection of the one or more first adjustments to the sidelink DRX configuration including an explanation for the rejection and an indication of one or more preferences of the receiver UE.

At 1610, the UE may transmit, to the receiver UE over the sidelink channel, during the at least a portion of the sidelink DRX active duration, via the transceiver, an indication that the transmitter UE intends to activate the one or more first adjustments to the sidelink DRX configuration when the response includes the positive ACK message. In the context of FIGS. 1, 5, 6 and 10-15, for example, the UE 104 may transmit its intention to activate the sidelink DRX configuration adjustments when the receiver UE accepts the adjustments. For instance, 1610 may be performed by one or more components described with respect to FIG. 4, e.g., controller/processor 459, transmit processor 468, receiver/transmitter 454 and/or antenna 452. The indication that the UE intends to activate the DRX configuration adjustments may be transmitted, e.g., by the DRX activation component 2046 via the transmission component 2034 of the apparatus 2002 in FIG. 20.

At 1612, the UE may determine one or more second adjustments to the sidelink DRX configuration based on the one or more preferences of the receiver UE. In the context of FIGS. 1 and 5-10, for example, the UE 104 may determine alternative adjustments based on the receiver UE preferences. For instance, 1612 may be performed by one or more components described with respect to FIG. 4, e.g., controller/processor 459. The one or more second adjustments to the DRX configuration may be determined, e.g., by the determination component 2040 through coordination with the DRX configuration adjustment component 2042 of the apparatus 2002 in FIG. 20.

At 1614, the UE may transmit, to the receiver UE over the sidelink channel, during the at least a portion of the sidelink DRX active duration, via the transceiver, a third message comprising an indication of the one or more second adjustments to the sidelink DRX configuration. In the context of FIGS. 1, 5, 6 and 10-15, for example, the UE 104 may provide an additional indication of the alternative adjustments to the sidelink DRX configuration. In some aspects, the UE may receive, from the receiver UE over the sidelink channel, via the transceiver, a fourth message comprising a response indicating whether the receiver UE accepts the one or more second adjustments to the sidelink DRX configuration. In turn, the UE may transmit, to the receiver UE over the sidelink channel, during the at least a portion of the sidelink DRX active duration, via the transceiver, an indication that the transmitter UE intends to confirm the one or more second adjustments to the sidelink DRX configuration. For instance, 1614 may be performed by one or more components described with respect to FIG. 4, e.g., controller/processor 459, transmit processor 468, receiver/transmitter 454 and/or antenna 452. The third message may be transmitted, e.g., by the DRX configuration adjustment component 2042 via the transmission component 2034 of the apparatus 2002 in FIG. 20.

FIG. 17 is a flowchart 1700 illustrating a process of wireless communication that supports sidelink DRX management of a sidelink DRX operation at a transmitter UE in accordance with some aspects of the present disclosure. As illustrated, the flowchart 1700 includes a number of enumerated steps, but embodiments of the flowchart 1700 may include additional steps before, after, and in between the enumerated steps. In some embodiments, one or more of the enumerated steps may be omitted or performed in a different order. Optional aspects are illustrated with a dashed line.

At 1702, the UE may determine one or more adjustments to a sidelink discontinuous reception (DRX) operation based on one or more factors of the transmitter UE. In the context of FIGS. 1, 5, 6 and 10-15, for example, the UE 104 may determine the sidelink DRX operation adjustments. For instance, 1702 may be performed by one or more components described with respect to FIG. 4, e.g., controller/processor 459. The one or more adjustments to the DRX operation may be determined, e.g., by the determination component 2040 through coordination with the DRX operation adjustment component 2044 of the apparatus 2002 in FIG. 20.

At 1704, the UE may transmit, to a receiver UE over a sidelink channel, during at least a portion of a sidelink DRX active duration, via the transceiver, a first message comprising an indication of the one or more adjustments to the sidelink DRX operation. In some aspects, the at least a portion of the sidelink DRX active duration includes an on duration period. In other aspects, the at least a portion of the sidelink DRX active duration corresponds to the on duration period. In some aspects, the UE may transmit, via the transceiver, a single instance of the MAC CE at a particular time within the on duration period. In other aspects, the UE may transmit, via the transceiver, a plurality of repetitions of the MAC CE at respective times within the on duration period. In the context of FIGS. 1, 5, 6 and 10-15, for example, the UE 104 may transmit the indication of the sidelink DRX operation adjustments. For instance, 1704 may be performed by one or more components described with respect to FIG. 4, e.g., controller/processor 459, transmit processor 468, receiver/transmitter 454 and/or antenna 452. The first message may be transmitted, e.g., by the DRX operation adjustment component 2044 via the transmission component 2034 of the apparatus 2002 in FIG. 20. In some aspects, the first message includes a MAC command, wherein the indication of the one or more adjustments to the sidelink DRX operation is included in the MAC command. In some aspects, the one or more first adjustments to the sidelink DRX operation correspond to one or more of an adjustment to a sidelink DRX timer value or an adjustment to a sidelink DRX timer operation. In some aspects, the UE may transmit, to a plurality of UEs over the sidelink, via the transceiver, the first message in a groupcast transmission. In some aspects, the indication indicates whether the one or more first adjustments to the sidelink DRX operation are negotiable between the transmitter UE and the receiver UE. In some aspects, the indication indicates whether the receiver UE is allowed to forward the indication to a third UE over a sidelink channel. In other aspects, the indication indicates whether the one or more first adjustments to the sidelink DRX operation are applicable to the receiver UE based on a location of the transmitter UE and a predetermined range criteria.

At 1706, the UE may receive, from the receiver UE over the sidelink channel, via the transceiver, a second message comprising a response indicating whether the receiver UE accepts the one or more first adjustments to the sidelink DRX operation. In the context of FIGS. 1, 5, 6 and 10-15, for example, the UE 104 may receive the response from the receiver UE. For instance, 1706 may be performed by one or more components described with respect to FIG. 4, e.g., controller/processor 459, receive processor 456, receiver/transmitter 454 and/or antenna 452. The second message may be received, e.g., by the adjustment processing component 2048 via the reception component 2030 of the apparatus 2002 in FIG. 20.

At 1708, the UE may determine whether the receiver UE accepted the one or more first adjustments to the sidelink DRX operation. If the receiver UE accepted the adjustments, then the process proceeds to block 1710. In some aspects, the response comprises a positive acknowledgment message indicating an acceptance to the one or more first adjustments to the sidelink DRX configuration. Otherwise, the process proceeds to block 1712. In some aspects, the response includes a negative acknowledgment message indicating that the receiver UE does not accept the one or more first adjustments to the sidelink DRX operation. In the context of FIGS. 1, 5, 6 and 10-15, for example, the UE 104 may perform the operation to determine whether the receiver UE accepted the sidelink DRX operation adjustments. For instance, 1708 may be performed by one or more components described with respect to FIG. 4, e.g., controller/processor 459. The determination of whether the receiver UE accepted the one or more adjustments to the DRX operation may be performed, e.g., by the determination component 2040 of the apparatus 2002 in FIG. 20.

In some aspects, the response includes a MAC CE that includes content indicating a rejection of the one or more first adjustments to the sidelink DRX operation including an explanation for the rejection and an indication of one or more preferences of the receiver UE.

At 1710, the UE may transmit, to the receiver UE over the sidelink channel, during the at least a portion of the sidelink DRX active duration, via the transceiver, an indication that the transmitter UE intends to activate the one or more first adjustments to the sidelink DRX operation when the response includes the positive ACK message. In the context of FIGS. 1, 5, 6 and 10-15, for example, the UE 104 may transmit its intention to activate the sidelink DRX operation adjustments when the receiver UE accepts the adjustments. For instance, 1710 may be performed by one or more components described with respect to FIG. 4, e.g., controller/processor 459, transmit processor 468, receiver/transmitter 454 and/or antenna 452. The indication that the UE intends to activate the DRX operation adjustments may be transmitted, e.g., by the DRX activation component 2046 via the transmission component 2034 of the apparatus 2002 in FIG. 20.

At 1712, the UE may determine one or more second adjustments to the sidelink DRX operation based on the one or more preferences of the receiver UE. In the context of FIGS. 1 and 5-10, for example, the UE 104 may determine alternative adjustments based on the receiver UE preferences. For instance, 1712 may be performed by one or more components described with respect to FIG. 4, e.g., controller/processor 459. The one or more second adjustments to the DRX operation may be determined, e.g., by the determination component 2040 through coordination with the DRX operation adjustment component 2044 of the apparatus 2002 in FIG. 20.

At 1714, the UE may transmit, to the receiver UE over the sidelink channel, during the at least a portion of the sidelink DRX active duration, via the transceiver, a third message comprising an indication of the one or more second adjustments to the sidelink DRX operation. In the context of FIGS. 1, 5, 6 and 10-15, for example, the UE 104 may provide an additional indication of the alternative adjustments to the sidelink DRX operation. In some aspects, the UE may receive, from the receiver UE over the sidelink channel, via the transceiver, a fourth message comprising a response indicating whether the receiver UE accepts the one or more second adjustments to the sidelink DRX operation. In turn, the UE may transmit, to the receiver UE over the sidelink channel, during the at least a portion of the sidelink DRX active duration, via the transceiver, an indication that the transmitter UE intends to confirm the one or more second adjustments to the sidelink DRX operation. For instance, 1714 may be performed by one or more components described with respect to FIG. 4, e.g., controller/processor 459, transmit processor 468, receiver/transmitter 454 and/or antenna 452. The third message may be transmitted, e.g., by the DRX operation adjustment component 2044 via the transmission component 2034 of the apparatus 2002 in FIG. 20.

FIG. 18 is a flowchart 1800 illustrating a process of wireless communication that supports sidelink DRX management of a sidelink DRX configuration at a receiver UE in accordance with some aspects of the present disclosure. As illustrated, the flowchart 1800 includes a number of enumerated steps, but embodiments of the flowchart 1800 may include additional steps before, after, and in between the enumerated steps. In some embodiments, one or more of the enumerated steps may be omitted or performed in a different order. Optional aspects are illustrated with a dashed line.

At 1802, the UE may receive, from a transmitter UE to a plurality of UEs over a sidelink channel, during at least a portion of a sidelink discontinuous reception cycle, a first message comprising an indication of one or more first adjustments to a sidelink DRX configuration. In the context of FIGS. 1 and 5-9, for example, the UE 104 may receive the first message that indicates the adjustments to the sidelink DRX configuration. In some aspects, the UE receive, from the transmitter UE over the sidelink, the first message in a groupcast transmission to the plurality of UEs. In some aspects, the at least a portion of the sidelink DRX active duration includes an on duration period. In other aspects, the at least a portion of the sidelink DRX active duration corresponds to the on duration period. For instance, 1802 may be performed by one or more components described with respect to FIG. 4, e.g., controller/processor 459, receive processor 456, receiver/transmitter 454 and/or antenna 452. The first message may be received, e.g., by the adjustment processing component 2048 via the reception component 2030 of the apparatus 2002 in FIG. 20.

In some aspects, the first message includes a MAC CE. In some aspects, the MAC CE includes the indication of the one or more first adjustments to the sidelink DRX configuration. In some aspects, the one or more first adjustments to the sidelink DRX configuration correspond to one or more of an adjustment to a DRX offset value, an adjustment to the at least a portion of the sidelink DRX active duration or an adjustment to a length of the sidelink DRX active duration.

At 1804, the UE may determine whether to respond to the indication of the one or more first adjustments to the sidelink DRX configuration based on one or more parameters of the receiver UE. In the context of FIGS. 1 and 5-9, for example, the UE 104 may determine to respond to the adjustments to the sidelink DRX configuration. For instance, 1804 may be performed by one or more components described with respect to FIG. 4, e.g., controller/processor 459. The determination of whether to respond to the indication may be performed, e.g., by the determination component 2040 through coordination with the adjustment processing component 2048 of the apparatus 2002 in FIG. 20.

At 1806, the UE may transmit, to the transmitter UE over the sidelink channel, a second message comprising a response indicating whether the receiver UE accepts the one or more first adjustments to the sidelink DRX configuration, when the indication indicates that the one or more first adjustments to the sidelink DRX configuration are negotiable. In the context of FIGS. 1 and 5-9, for example, the UE 104 may transmit the response to the sidelink DRX configuration adjustments. For instance, 1806 may be performed by one or more components described with respect to FIG. 4, e.g., controller/processor 459, transmit processor 468, receiver/transmitter 454 and/or antenna 452. The second message may be transmitted, e.g., by the adjustment processing component 2048 via the transmission component 2034 of the apparatus 2002 in FIG. 20.

In some aspects, the indication may indicate whether the one or more first adjustments to the sidelink DRX configuration are negotiable between the receiver UE and the transmitter UE. In some aspects, the UE may transmit, to the transmitter UE over the sidelink channel, a second message that includes a response indicating whether the receiver UE accepts the one or more first adjustments to the sidelink DRX configuration, when the indication indicates that the one or more first adjustments to the sidelink DRX configuration are negotiable. In some aspects, the response includes a positive acknowledgment message indicating an acceptance to adjust the sidelink DRX configuration. In some aspects, the UE may receive, from the transmitter UE over the sidelink channel, during the at least a portion of the sidelink DRX active duration, an indication that the transmitter UE intends to activate the one or more first adjustments to the sidelink DRX configuration when the response includes the positive ACK message.

In other aspects, the response includes a negative acknowledgment message indicating that the transmitter UE does not accept the one or more first adjustments to the sidelink DRX configuration. In other aspects, the response includes a MAC CE that includes content indicating a rejection of the one or more first adjustments to the sidelink DRX configuration including an explanation for the rejection and an indication of one or more preferences of the receiver UE. In some aspects, the UE may receive, from the transmitter UE over the sidelink channel, during the at least a portion of the sidelink DRX active duration, a third message that includes an indication of one or more second adjustments to the sidelink DRX configuration associated with the one or more preferences of the receiver UE. In this regard, the UE may transmit, to the transmitter UE over the sidelink channel, a fourth message that includes a response indicating whether the receiver UE accepts the one or more second adjustments to the sidelink DRX configuration. In turn, the UE may receive, from the transmitter UE over the sidelink channel, during the at least a portion of the sidelink DRX active duration, an indication that the transmitter UE intends to confirm the one or more second adjustments to the sidelink DRX configuration.

In some aspects, the UE may determine whether to forward the indication of the one or more first adjustments to one or more UEs. At 1808, the UE may transmit, to the one or more UEs over the sidelink channel, during the at least a portion of the sidelink DRX active duration, the indication, when the receiver UE determines to forward the indication to the one or more UEs. In the context of FIGS. 1 and 5-9, for example, the UE 104 may forward the indication to other sidelink UEs. For instance, 1808 may be performed by one or more components described with respect to FIG. 4, e.g., controller/processor 459, transmit processor 468, receiver/transmitter 454 and/or antenna 452. The indication may be transmitted, e.g., by the forwarding component 2050 through coordination with the adjustment processing component 2048 via the transmission component 2034 of the apparatus 2002 in FIG. 20.

In some aspects, the indication may indicate whether the receiver UE is allowed to forward the indication to another UE over the sidelink channel. In this regard, the UE may determine to forward the indication to one or more UEs when the indication indicates that the receiver UE is allowed to forward the indication. In some aspects, as part of the UE determining whether to forward the indication, the UE may determine whether a response is received from one or more UEs in proximity to the receiver UE. In this regard, the UE may transmit, to the one or more UEs over the sidelink channel, during the at least a portion of the sidelink DRX active duration, the indication, when the receiver UE determines that a response is received from the one or more UEs in proximity to the receiver UE. In other aspects, the UE may determine whether forwarding the indication to one or more UEs is redundant. In this regard, the UE may transmit, to the one or more UEs over the sidelink channel, during the at least a portion of the sidelink DRX active duration, the indication, when the receiver UE determines that forwarding the indication to the one or more UEs is not redundant.

In some aspects, the indication indicates a predetermined maximum hop value such that the UE may determine whether a current hop value associated with the receiver UE exceeds the predetermined maximum hop value. The UE may determine to forward the indication to one or more UEs when the current hop value associated with the receiver UE does not exceed the predetermined maximum hop value. In other aspects, the UE may determine to forward the indication to one or more UEs when a current location of the receiver UE does not exceed a predetermined range criteria included in the indication. The predetermined range criteria may indicate a maximum range relative to the transmitter UE. In some aspects, the UE may determine whether data is available to multiplex with the MAC CE, and the UE may determine to forward the indication to one or more UEs when data is available to multiplex with the MAC CE. In other aspects, the UE may determine whether the MAC CE is to be forwarded independent of data when the data is not available to multiplex with the MAC CE, and determine to forward the indication to one or more UEs based on a priority of the MAC CE when the MAC CE is to be forwarded independent of data.

FIG. 19 is a flowchart 1900 illustrating a process of wireless communication that supports sidelink DRX management of a sidelink DRX operation at a receiver UE in accordance with some aspects of the present disclosure. As illustrated, the flowchart 1900 includes a number of enumerated steps, but embodiments of the flowchart 1900 may include additional steps before, after, and in between the enumerated steps. In some embodiments, one or more of the enumerated steps may be omitted or performed in a different order. Optional aspects are illustrated with a dashed line.

At 1902, the UE may receive, from a transmitter UE to a plurality of UEs over a sidelink channel, during at least a portion of a sidelink discontinuous reception cycle, a first message comprising an indication of one or more first adjustments to a sidelink DRX operation. In the context of FIGS. 1, 5, 6 and 10-15, for example, the UE 104 may receive the first message that indicates the adjustments to the sidelink DRX operation. For instance, 1902 may be performed by one or more components described with respect to FIG. 4, e.g., controller/processor 459, receive processor 456, receiver/transmitter 454 and/or antenna 452. The first message may be received, e.g., by the adjustment processing component 2048 via the reception component 2030 of the apparatus 2002 in FIG. 20. In some aspects, the UE receive, from the transmitter UE over the sidelink, the first message in a groupcast transmission to the plurality of UEs. In some aspects, the at least a portion of the sidelink DRX active duration includes an on duration period. In other aspects, the at least a portion of the sidelink DRX active duration corresponds to the on duration period.

In some aspects, the first message includes MAC command. In some aspects, the MAC command includes the indication of the one or more first adjustments to the sidelink DRX operation. In some aspects, the one or more first adjustments to the sidelink DRX operation correspond to one or more of an adjustment to a sidelink DRX timer value or an adjustment to a sidelink DRX timer operation.

At 1904, the UE may determine whether to respond to the indication of the one or more first adjustments to the sidelink DRX operation based on one or more parameters of the receiver UE. In the context of FIGS. 1, 5, 6 and 10-15, for example, the UE 104 may determine to respond to the adjustments to the sidelink DRX operation. For instance, 1904 may be performed by one or more components described with respect to FIG. 4, e.g., controller/processor 459. The determination of whether to respond to the indication may be performed, e.g., by the determination component 2040 through coordination with the adjustment processing component 2048 of the apparatus 2002 in FIG. 20.

At 1906, the UE may transmit, to the transmitter UE over the sidelink channel, a second message comprising a response indicating whether the receiver UE accepts the one or more first adjustments to the sidelink DRX operation, when the indication indicates that the one or more first adjustments to the sidelink DRX operation are negotiable. In the context of FIGS. 1, 5, 6 and 10-15, for example, the UE 104 may transmit the response to the sidelink DRX operation adjustments. For instance, 1906 may be performed by one or more components described with respect to FIG. 4, e.g., controller/processor 459, transmit processor 468, receiver/transmitter 454 and/or antenna 452. The second message may be transmitted, e.g., by the adjustment processing component 2048 via the transmission component 2034 of the apparatus 2002 in FIG. 20.

In some aspects, the indication may indicate whether the one or more first adjustments to the sidelink DRX operation are negotiable between the receiver UE and the transmitter UE. In some aspects, the UE may transmit, to the transmitter UE over the sidelink channel, a second message that includes a response indicating whether the receiver UE accepts the one or more first adjustments to the sidelink DRX operation, when the indication indicates that the one or more first adjustments to the sidelink DRX operation are negotiable. In some aspects, the response includes a positive acknowledgment message indicating an acceptance to adjust the sidelink DRX operation. In some aspects, the UE may receive, from the transmitter UE over the sidelink channel, during the at least a portion of the sidelink DRX active duration, an indication that the transmitter UE intends to activate the one or more first adjustments to the sidelink DRX operation when the response includes the positive ACK message.

In other aspects, the response includes a negative acknowledgment message indicating that the transmitter UE does not accept the one or more first adjustments to the sidelink DRX operation. In other aspects, the response includes a MAC CE that includes content indicating a rejection of the one or more first adjustments to the sidelink DRX operation including an explanation for the rejection and an indication of one or more preferences of the receiver UE. In some aspects, the UE may receive, from the transmitter UE over the sidelink channel, during the at least a portion of the sidelink DRX active duration, a third message that includes an indication of one or more second adjustments to the sidelink DRX operation associated with the one or more preferences of the receiver UE. In this regard, the UE may transmit, to the transmitter UE over the sidelink channel, a fourth message that includes a response indicating whether the receiver UE accepts the one or more second adjustments to the sidelink DRX operation. In turn, the UE may receive, from the transmitter UE over the sidelink channel, during the at least a portion of the sidelink DRX active duration, an indication that the transmitter UE intends to confirm the one or more second adjustments to the sidelink DRX operation.

In some aspects, the UE may determine whether to forward the indication of the one or more first adjustments to one or more UEs. At 1908, the UE may transmit, to the one or more UEs over the sidelink channel, during the at least a portion of the sidelink DRX active duration, the indication, when the receiver UE determines to forward the indication to the one or more UEs. In the context of FIGS. 1, 5, 6 and 10-15, for example, the UE 104 may forward the indication to other sidelink UEs. For instance, 1908 may be performed by one or more components described with respect to FIG. 4, e.g., controller/processor 459, transmit processor 468, receiver/transmitter 454 and/or antenna 452. The indication may be transmitted, e.g., by the forwarding component 2050 through coordination with the adjustment processing component 2048 via the transmission component 2034 of the apparatus 2002 in FIG. 20.

In some aspects, the indication may indicate whether receiver UE is allowed to forward the indication to another UE over the sidelink channel. In this regard, the UE may determine to forward the indication to one or more UEs when the indication indicates that the receiver UE is allowed to forward the indication. In some aspects, as part of the UE determining whether to forward the indication, the UE may determine whether a response is received from one or more UEs in proximity to the receiver UE. In this regard, the UE may transmit, to the one or more UEs over the sidelink channel, during the at least a portion of the sidelink DRX active duration, the indication, when the receiver UE determines that a response is received from the one or more UEs in proximity to the receiver UE. In other aspects, the UE may determine whether forwarding the indication to one or more UEs is redundant. In this regard, the UE may transmit, to the one or more UEs over the sidelink channel, during the at least a portion of the sidelink DRX active duration, the indication, when the receiver UE determines that forwarding the indication to the one or more UEs is not redundant. In some aspects, the indication indicates a predetermined maximum hop value such that the UE may determine whether a current hop value associated with the receiver UE exceeds the predetermined maximum hop value. The UE may determine to forward the indication to one or more UEs when the current hop value associated with the receiver UE does not exceed the predetermined maximum hop value. In other aspects, the UE may determine to forward the indication to one or more UEs when a current location of the receiver UE does not exceed a predetermined range criteria included in the indication. The predetermined range criteria may indicate a maximum range relative to the transmitter UE.

Figure 20:
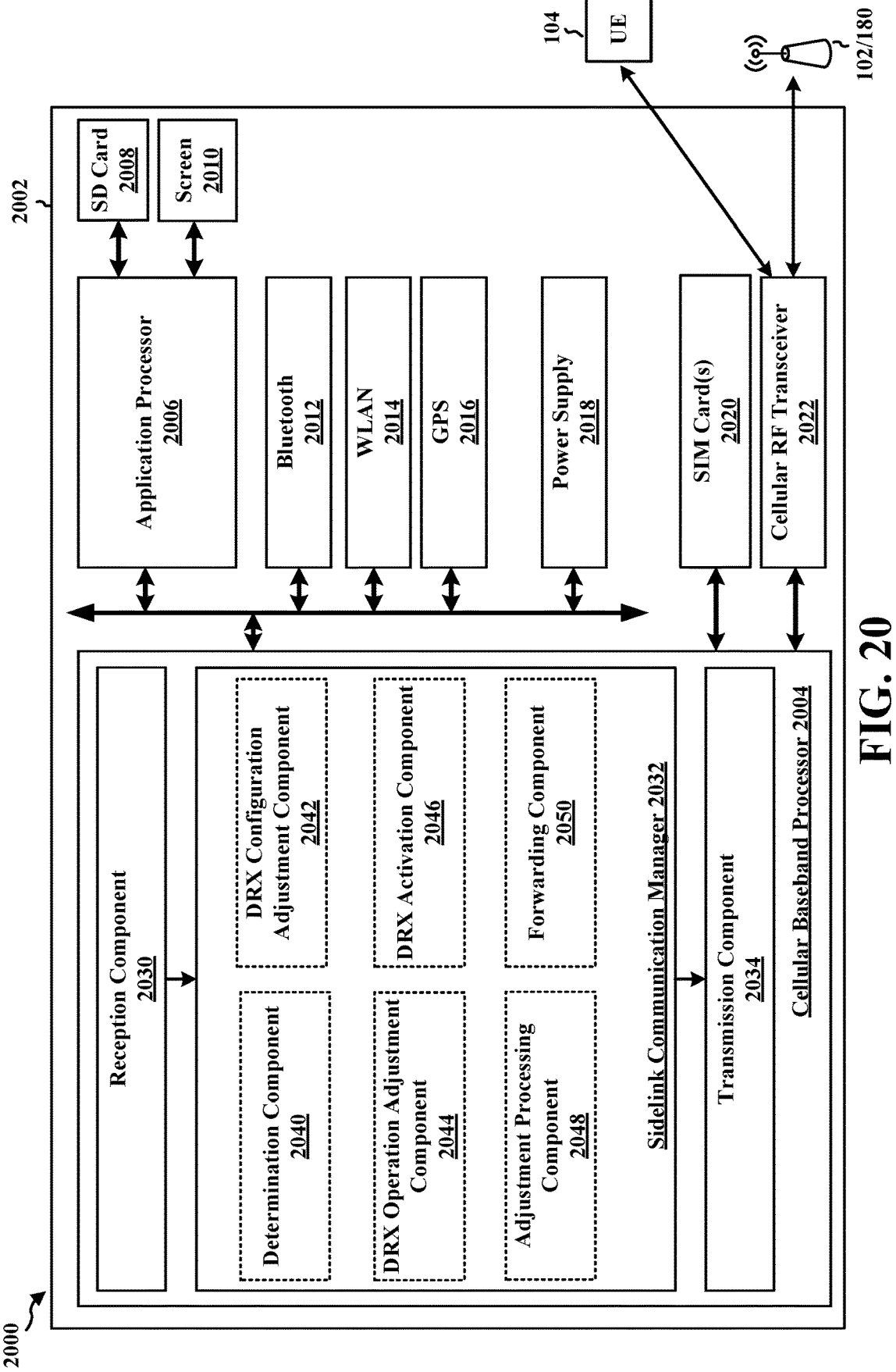
FIG. 20 is a diagram illustrating an example of a hardware implementation for an example apparatus.

FIG. 20 is a diagram 2000 illustrating an example of a hardware implementation for an apparatus 2002. The apparatus 2002 may be a UE or other wireless device that communicates based on sidelink. The apparatus 2002 includes a cellular baseband processor 2004 (also referred to as a modem) coupled to a cellular RF transceiver 2022 and one or more subscriber identity modules (SIM) cards 2020, an application processor 2006 coupled to a secure digital (SD) card 2008 and a screen 2010, a Bluetooth module 2012, a wireless local area network (WLAN) module 2014, a Global Positioning System (GPS) module 2016, and a power supply 2018. The cellular baseband processor 2004 communicates through the cellular RF transceiver 2022 with other wireless devices, such as a UE 204 and/or base station 202/180. The cellular baseband processor 2004 may include a computer-readable medium/memory. The cellular baseband processor 2004 is responsible for general processing, including the execution of software stored on the computer-readable medium/memory. The software, when executed by the cellular baseband processor 2004, causes the cellular baseband processor 2004 to perform the various functions described supra. The computer-readable medium/memory may also be used for storing data that is manipulated by the cellular baseband processor 2004 when executing software. The cellular baseband processor 2004 further includes a reception component 2030, a sidelink communication manager 2032, and a transmission component 2034. The sidelink communication manager 2032 includes the one or more illustrated components. The components within the sidelink communication manager 2032 may be stored in the computer-readable medium/memory and/or configured as hardware within the cellular baseband processor 2004. The cellular baseband processor 2004 may be a component of the device 410 or 450 and may include the memory 460 or 476 and/or at least one of the TX processor 416 or 468, the RX processor 456 or 470, and the controller/processor 459 or 475. In one configuration, the apparatus 2002 may be a modem chip and include just the baseband processor 2004, and in another configuration, the apparatus 2002 may be the entire wireless device (e.g., see the device 410 or 450 of FIG. 4) and include the additional modules of the apparatus 2002.

The sidelink communication manager 2032 includes a determination component 2040, a DRX configuration adjustment component 2042, a DRX operation adjustment component 2044, a DRX activation component 2046, an adjustment processing component 2048, and/or a forwarding component 2050 configured to perform the aspects described in connection with the processes in FIGS. 16-19. The apparatus is illustrated as including components to perform the processes of FIGS. 16-19, because the wireless device may operate as a transmitting device at times and may operate as a receiving device at other times.

The apparatus 2002 may include additional components that perform each of the blocks of the algorithms in the aforementioned flowcharts of FIGS. 16-19. As such, each block in the aforementioned flowcharts of FIGS. 16-19 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 2002, and in particular the cellular baseband processor 2004, includes means for determining one or more first adjustments to a sidelink discontinuous reception (DRX) configuration based on one or more parameters associated with the transmitter UE. The apparatus 2002 may also include means for transmitting, to a receiver UE over a sidelink channel, during at least a portion of a sidelink DRX active duration, a first message comprising an indication of the one or more first adjustments to the sidelink DRX configuration.

In another configuration, the apparatus 2002, and in particular the cellular baseband processor 2004, includes means for receiving, from a transmitter UE over a sidelink channel, during at least a portion of a sidelink discontinuous reception (DRX) cycle, a first message comprising an indication of one or more first adjustments to a sidelink DRX configuration further includes that the first message is included in a sidelink transmission to a plurality of UEs. The apparatus 2002 may also include means for determining whether to respond to the indication of the one or more first adjustments to the sidelink DRX configuration based on one or more parameters of the receiver UE.

In still another configuration, the apparatus 2002, and in particular the cellular baseband processor 2004, includes means for determining one or more first adjustments to a sidelink discontinuous reception (DRX) operation based on one or more parameters associated with the transmitter UE. The apparatus 2002 may also include means for transmitting, to a receiver UE over a sidelink channel, during at least a portion of a sidelink DRX active duration, a first message comprising an indication of the one or more first adjustments to the sidelink DRX operation.

In yet another configuration, the apparatus 2002, and in particular the cellular baseband processor 2004, includes means for receiving, from a transmitter UE over a sidelink channel, during at least a portion of a sidelink discontinuous reception (DRX) cycle, a first message comprising an indication of one or more first adjustments to a sidelink DRX operation further includes that the first message is included in a sidelink transmission to a plurality of UEs. The apparatus 2002 may also include means for determining whether to respond to the indication of the one or more first adjustments to the sidelink DRX operation based on one or more parameters of the receiver UE.

The aforementioned means may be one or more of the aforementioned components of the apparatus 2002 configured to perform the functions recited by the aforementioned means. As described supra, the apparatus 2002 may include the TX Processor 416 or 468, the RX Processor 456 or 470, and the controller/processor 459 or 475. As such, in one configuration, the aforementioned means may be the TX Processor 416 or 468, the RX Processor 456 or 470, and the controller/processor 459 or 475 configured to perform the functions recited by the aforementioned means.

The following aspects are illustrative only and aspects thereof may be combined with aspects of other examples or teaching described herein, without limitation.

Aspect 1 is a method of wireless communication performed by a transmitter user equipment (UE) that includes determining one or more first adjustments to a sidelink discontinuous reception (DRX) configuration based on one or more parameters associated with the transmitter UE; and transmitting, to a receiver UE over a sidelink channel, during at least a portion of a sidelink DRX active duration, a first message comprising an indication of the one or more first adjustments to the sidelink DRX configuration.

In Aspect 2, the method of Aspect 1 further includes that the first message comprises a media access control (MAC) control element (MAC CE) further includes that the indication of the one or more first adjustments to the sidelink DRX configuration is included in the MAC CE further includes that the one or more first adjustments to the sidelink DRX configuration correspond to one or more of an adjustment to a DRX offset value, an adjustment to the at least a portion of the sidelink DRX active duration or an adjustment to a length of the sidelink DRX active duration.

In Aspect 3, the method of Aspect 1 or Aspect 2 further includes that the transmitting the first message comprises transmitting, to a plurality of UEs over a sidelink channel, the first message.

In Aspect 4, the method of Aspect 3 further includes that the transmitting the first message comprises trfansmitting, to the plurality of UEs over the sidelink, the first message in a groupcast transmission.

In Aspect 5, the method of any of Aspects 1-4 further includes that the indication indicates whether the one or more first adjustments to the sidelink DRX configuration are negotiable between the transmitter UE and the receiver UE.

In Aspect 6, the method of any of Aspects 1-5 further includes that the indication indicates whether the receiver UE is allowed to forward the indication to another UE over a second sidelink channel.

In Aspect 7, the method of any of Aspects 1-6 further includes that the indication indicates whether the one or more first adjustments to the sidelink DRX configuration are applicable to the receiver UE based on a location of the transmitter UE and a predetermined range criteria.

In Aspect 8, the method of any of Aspects 1-7 further includes receiving, from the receiver UE over the sidelink channel, a second message comprising a response indicating whether the receiver UE accepts the one or more first adjustments to the sidelink DRX configuration.

In Aspect 9, the method of Aspect 8 further includes that the response comprises a positive acknowledgment (ACK) message indicating an acceptance to the one or more first adjustments to the sidelink DRX configuration.

In Aspect 10, the method of Aspect 9 further includes transmitting, to the receiver UE over the sidelink channel, during the at least a portion of the sidelink DRX active duration, an indication that the transmitter UE intends to activate the one or more first adjustments to the sidelink DRX configuration when the response includes the positive ACK message.

In Aspect 11, the method of Aspect 8 further includes that the response comprises a negative acknowledgment (NACK) message indicating that the receiver UE does not accept the one or more first adjustments to the sidelink DRX configuration.

In Aspect 12, the method of Aspect 8 further includes that the response comprises a media access control (MAC) control element (MAC CE) that includes content indicating a rejection of the one or more first adjustments to the sidelink DRX configuration including an explanation for the rejection and an indication of one or more preferences of the receiver UE.

In Aspect 13, the method of Aspect 12 further includes determining one or more second adjustments to the sidelink DRX configuration based on the one or more preferences of the receiver UE; and transmitting, to the receiver UE over the sidelink channel, during the at least a portion of the sidelink DRX active duration, a third message comprising an indication of the one or more second adjustments to the sidelink DRX configuration.

In Aspect 14, the method of Aspect 13 further includes receiving, from the receiver UE over the sidelink channel, a fourth message comprising a response indicating whether the receiver UE accepts the one or more second adjustments to the sidelink DRX configuration; and transmitting, to the receiver UE over the sidelink channel, during the at least a portion of the sidelink DRX active duration, an indication that the transmitter UE intends to confirm the one or more second adjustments to the sidelink DRX configuration.

In Aspect 15, the method of Aspect 12 further includes that the at least a portion of the sidelink DRX active duration comprises an on duration period.

In Aspect 16, the method of Aspect 15 further includes that the transmitting the first message comprises transmitting a single instance of the MAC CE at a particular time within the on duration period.

In Aspect 17, the method of Aspect 15 further includes that the transmitting the first message comprises transmitting a plurality of repetitions of the MAC CE at respective times within the on duration period.

Aspect 18 is a device including one or more processors and one or more memories in electronic communication with the one or more processors storing instructions executable by the one or more processors to cause the device to implement a method as in any of Aspects 1-17.

Aspect 19 is a system or apparatus including means for implementing a method or realizing an apparatus as in any of Aspects 1-17.

Aspect 20 is a non-transitory computer readable medium storing instructions executable by one or more processors to cause the one or more processors to implement a method as in any of Aspects 1-17.

Aspect 21 is a method of wireless communication performed by a receiver user equipment (UE) that includes receiving, from a transmitter UE over a sidelink channel, during at least a portion of a sidelink discontinuous reception (DRX) cycle, a first message comprising an indication of one or more first adjustments to a sidelink DRX configuration further includes that the first message is included in a sidelink transmission to a plurality of UEs; and determining whether to respond to the indication of the one or more first adjustments to the sidelink DRX configuration based on one or more parameters of the receiver UE.

In Aspect 22, the method of Aspect 21 further includes determining whether to forward the indication of the one or more first adjustments to one or more UEs; and transmitting, to the one or more of UEs over the sidelink channel, during the at least a portion of the sidelink DRX active duration, the indication, when the receiver UE determines to forward the indication to the one or more UEs.

In Aspect 23, the method of Aspect 21 or Aspect 22 further includes that the first message comprises a media access control (MAC) control element (MAC CE) further includes that the indication of the one or more first adjustments to the sidelink DRX configuration is included in the MAC CE further includes that the one or more first adjustments to the sidelink DRX configuration correspond to one or more of an adjustment to a DRX offset value, an adjustment to the at least a portion of the sidelink DRX active duration or an adjustment to a length of the sidelink DRX active duration.

In Aspect 24, the method of Aspect 23 further includes determining whether data is available to multiplex with the MAC CE; and determining to forward the indication to one or more UEs when data is available to multiplex with the MAC CE.

In Aspect 25, the method of Aspect 24 further includes determining whether the MAC CE is to be forwarded independent of data when the data is not available to multiplex with the MAC CE; and determining to forward the indication to one or more UEs based on a priority of the MAC CE when the MAC CE is to be forwarded independent of data.

In Aspect 26, the method of any of Aspects 21-25 further includes that the receiving the first message comprises receiving, from the transmitter UE over the sidelink, the first message in a groupcast transmission to the plurality of UEs.

In Aspect 27, the method of any of Aspects 21-26 further includes that the indication indicates whether the receiver UE is allowed to forward the indication to another UE over the sidelink channel.

In Aspect 28, the method of Aspect 27 further includes determining to forward the indication to one or more UEs when the indication indicates that the receiver UE is allowed to forward the indication.

In Aspect 29, the method of any of Aspects 21-28 further includes that the indication indicates a predetermined maximum hop value, and further comprising determining to forward the indication to one or more UEs when a current hop value associated with the receiver UE does not exceed the predetermined maximum hop value.

In Aspect 30, the method of any of Aspects 21-29 further includes that the indication indicates whether the one or more first adjustments to the sidelink DRX configuration are applicable to the receiver UE based on a location of the transmitter UE and a predetermined range criteria.

In Aspect 31, the method of Aspect 30 further includes determining to forward the indication to one or more UEs when a current location of the receiver UE does not exceed the predetermined range criteria.

In Aspect 32, the method of any of Aspects 21-31 further includes that the indication indicates whether the one or more first adjustments to the sidelink DRX configuration are negotiable between the receiver UE and the transmitter UE.

In Aspect 33, the method of Aspect 32 further includes transmitting, to the transmitter UE over the sidelink channel, a second message comprising a response indicating whether the receiver UE accepts the one or more first adjustments to the sidelink DRX configuration, when the indication indicates that the one or more first adjustments to the sidelink DRX configuration are negotiable.

In Aspect 34, the method of Aspect 33 further includes that the response comprises a positive acknowledgment (ACK) message indicating an acceptance to adjust the sidelink DRX configuration.

In Aspect 35, the method of Aspect 34 further includes receiving, from the transmitter UE over the sidelink channel, during the at least a portion of the sidelink DRX active duration, an indication that the transmitter UE intends to activate the one or more first adjustments to the sidelink DRX configuration when the response includes the positive ACK message.

In Aspect 36, the method of Aspect 33 further includes that the response comprises a negative acknowledgment (NACK) message indicating that the transmitter UE does not accept the one or more first adjustments to the sidelink DRX configuration.

In Aspect 37, the method of Aspect 33 further includes that the response comprises a media access control (MAC) control element (MAC CE) that includes content indicating a rejection of the one or more first adjustments to the sidelink DRX configuration including an explanation for the rejection and an indication of one or more preferences of the receiver UE.

In Aspect 38, the method of Aspect 37 further includes receiving, from the transmitter UE over the sidelink channel, during the at least a portion of the sidelink DRX active duration, a third message comprising an indication of one or more second adjustments to the sidelink DRX configuration associated with the one or more preferences of the receiver UE.

In Aspect 39, the method of Aspect 38 further includes transmitting, to the transmitter UE over the sidelink channel, a fourth message comprising a response indicating whether the receiver UE accepts the one or more second adjustments to the sidelink DRX configuration; and receiving, from the transmitter UE over the sidelink channel, during the at least a portion of the sidelink DRX active duration, an indication that the transmitter UE intends to confirm the one or more second adjustments to the sidelink DRX configuration.

In Aspect 40, the method of Aspect 37 further includes that the at least a portion of the sidelink DRX active duration comprises an on duration period.

In Aspect 41, the method of Aspect 40 further includes that the receiving the first message comprises receiving a single instance of the MAC CE at a particular time within the on duration period.

In Aspect 42, the method of Aspect 40 further includes that the receiving the first message comprises receiving a plurality of repetitions of the MAC CE at respective times within the on duration period.

Aspect 43 is a device including one or more processors and one or more memories in electronic communication with the one or more processors storing instructions executable by the one or more processors to cause the device to implement a method as in any of Aspects 21-42.

Aspect 44 is a system or apparatus including means for implementing a method or realizing an apparatus as in any of Aspects 21-42.

Aspect 45 is a non-transitory computer readable medium storing instructions executable by one or more processors to cause the one or more processors to implement a method as in any of Aspects 41-42.

Aspect 46 is a method of wireless communication performed by a transmitter user equipment (UE) that includes determining one or more first adjustments to a sidelink discontinuous reception (DRX) operation based on one or more parameters associated with the transmitter UE; and transmitting, to a receiver UE over a sidelink channel, during at least a portion of a sidelink DRX active duration, a first message comprising an indication of the one or more first adjustments to the sidelink DRX operation.

In Aspect 47, the method of Aspect 46 further includes that the first message comprises a media access control (MAC) command further includes that the indication of the one or more first adjustments to the sidelink DRX operation is included in the MAC command further includes that the one or more first adjustments to the sidelink DRX operation correspond to one or more of an adjustment to a sidelink DRX timer value or an adjustment to a sidelink DRX timer operation.

In Aspect 48, the method of Aspect 46 or Aspect 47 further includes that the transmitting the first message comprises transmitting, to a plurality of UEs over a sidelink channel, the first message.

In Aspect 49, the method of Aspect 48 further includes that the transmitting the first message comprises transmitting, to the plurality of UEs over the sidelink, the first message in a groupcast transmission.

In Aspect 50, the method of any of Aspects 46-49 further includes that the indication indicates whether the one or more first adjustments to the sidelink DRX operation are negotiable between the transmitter UE and the receiver UE.

In Aspect 51, the method of any of Aspects 46-50 further includes that the indication indicates whether the receiver UE is allowed to forward the indication to a third UE over a sidelink channel.

In Aspect 52, the method of any of Aspects 46-51 further includes that the indication indicates whether the one or more first adjustments to the sidelink DRX operation are applicable to the receiver UE based on a location of the transmitter UE and a predetermined range criteria.

In Aspect 53, the method of any of Aspects 46-52 further includes receiving, from the receiver UE over the sidelink channel, a second message comprising a response indicating whether the receiver UE accepts the one or more first adjustments to the sidelink DRX operation.

In Aspect 54, the method of Aspect 53 further includes that the response comprises a positive acknowledgment (ACK) message indicating an acceptance to the one or more first adjustments to the sidelink DRX operation.

In Aspect 55, the method of Aspect 54 further includes transmitting, to the receiver UE over the sidelink channel, during the at least a portion of the sidelink DRX active duration, an indication that the transmitter UE intends to activate the one or more first adjustments to the sidelink DRX operation when the response includes the positive ACK message.

In Aspect 56, the method of Aspect 53 further includes that the response comprises a negative acknowledgment (NACK) message indicating that the receiver UE does not accept the one or more first adjustments to the sidelink DRX operation.

In Aspect 57, the method of Aspect 53 further includes that the response comprises a media access control (MAC) control element (MAC CE) that includes content indicating a rejection of the one or more first adjustments to the sidelink DRX operation including an explanation for the rejection and an indication of one or more preferences of the receiver UE.

In Aspect 58, the method of Aspect 57 further includes determining one or more second adjustments to the sidelink DRX operation based on the one or more preferences of the receiver UE; and transmitting, to the receiver UE over the sidelink channel, during the at least a portion of the sidelink DRX active duration, a third message comprising an indication of the one or more second adjustments to the sidelink DRX operation.

In Aspect 59, the method of Aspect 58 further includes receiving, from the receiver UE over the sidelink channel, a fourth message comprising a response indicating whether the receiver UE accepts the one or more second adjustments to the sidelink DRX operation; and transmitting, to the receiver UE over the sidelink channel, during the at least a portion of the sidelink DRX active duration, an indication that the transmitter UE intends to confirm the one or more second adjustments to the sidelink DRX operation.

In Aspect 60, the method of Aspect 57 further includes that the at least a portion of the sidelink DRX active duration comprises an on duration period.

In Aspect 61, the method of Aspect 60 further includes that the transmitting the first message comprises transmitting a single instance of the first message at a particular time within the on duration period.

In Aspect 62, the method of Aspect 60 further includes that the transmitting the first message comprises transmitting a plurality of repetitions of the first message at respective times within the on duration period.

Aspect 63 is a device including one or more processors and one or more memories in electronic communication with the one or more processors storing instructions executable by the one or more processors to cause the device to implement a method as in any of Aspects 46-62.

Aspect 64 is a system or apparatus including means for implementing a method or realizing an apparatus as in any of Aspects 46-62.

Aspect 65 is a non-transitory computer readable medium storing instructions executable by one or more processors to cause the one or more processors to implement a method as in any of Aspects 46-62.

Aspect 66 is a method of wireless communication performed by a receiver user equipment (UE) that includes receiving, from a transmitter UE over a sidelink channel, during at least a portion of a sidelink discontinuous reception (DRX) cycle, a first message comprising an indication of one or more first adjustments to a sidelink DRX operation further includes that the first message is included in a sidelink transmission to a plurality of UEs; and determining whether to respond to the indication of the one or more first adjustments to the sidelink DRX operation based on one or more parameters of the receiver UE.

In Aspect 67, the method of Aspect 66 further includes determining whether to forward the indication of the one or more first adjustments to one or more UEs; and transmitting, to the one or more UEs over the sidelink channel, during the at least a portion of the sidelink DRX active duration, the indication, when the receiver UE determines to forward the indication to the one or more UEs.

In Aspect 68, the method of Aspect 66 or Aspect 67 further includes that the first message comprises a media access control (MAC) command further includes that the indication of the one or more first adjustments to the sidelink DRX operation is included in the MAC command further includes that the one or more first adjustments to the sidelink DRX operation correspond to one or more of an adjustment to a sidelink DRX timer value or an adjustment to a sidelink DRX timer operation.

In Aspect 69, the method of any of Aspects 66-68 further includes determining whether a response is received from one or more UEs in proximity to the receiver UE; and transmitting, to the one or more UEs over the sidelink channel, during the at least a portion of the sidelink DRX active duration, the indication, when the receiver UE determines that a response is received from the one or more UEs in proximity to the receiver UE.

In Aspect 70, the method of any of Aspects 66-69 further includes determining whether forwarding the indication to one or more UEs is redundant; and transmitting, to the one or more UEs over the sidelink channel, during the at least a portion of the sidelink DRX active duration, the indication, when the receiver UE determines that forwarding the indication to the one or more UEs is not redundant.

In Aspect 71, the method of any of Aspects 66-70 further includes that the receiving the first message comprises receiving, from the transmitter UE over the sidelink, the first message in a groupcast transmission to the plurality of UEs.

In Aspect 72, the method of any of Aspects 66-71 further includes that the indication indicates whether the receiver UE is allowed to forward the indication to another UE over the sidelink channel.

In Aspect 73, the method of Aspect 72 further includes determining to forward the indication to one or more UEs when the indication indicates that the receiver UE is allowed to forward the indication; and transmitting, to the one or more UEs over the sidelink channel, during the at least a portion of the sidelink DRX active duration, the indication.

In Aspect 74, the method of any of Aspects 66-73 further includes that the indication indicates a predetermined maximum hop value, and further comprising determining whether a current hop value associated with the receiver UE exceeds the predetermined maximum hop value; determining to forward the indication to one or more UEs when the current hop value associated with the receiver UE does not exceed the predetermined maximum hop value; and transmitting, to the one or more UE over the sidelink channel, during the at least a portion of the sidelink DRX active duration, the indication.

In Aspect 75, the method of any of Aspects 66-74 further includes that the indication indicates whether the one or more first adjustments to the sidelink DRX operation are applicable to the receiver UE based on a location of the transmitter UE and a predetermined range criteria.

In Aspect 76, the method of Aspect 75 further includes determining to forward the indication to one or more UEs when a current location of the receiver UE does not exceed the predetermined range criteria; and transmitting, to the one or more UE over the sidelink channel, during the at least a portion of the sidelink DRX active duration, the indication.

In Aspect 77, the method of any of Aspects 66-76 further includes that the indication indicates whether the one or more first adjustments to the sidelink DRX operation are negotiable between the receiver UE and the transmitter UE.

In Aspect 78, the method of Aspect 77 further includes transmitting, to the transmitter UE over the sidelink channel, a second message comprising a response indicating whether the receiver UE accepts the one or more first adjustments to the sidelink DRX operation, when the indication indicates that the one or more first adjustments to the sidelink DRX operation are negotiable.

In Aspect 79, the method of Aspect 78 further includes that the response comprises a positive acknowledgment (ACK) message indicating an acceptance to adjust the sidelink DRX operation.

In Aspect 80, the method of Aspect 79 further includes receiving, from the transmitter UE over the sidelink channel, during the at least a portion of the sidelink DRX active duration, an indication that the transmitter UE intends to activate the one or more first adjustments to the sidelink DRX operation when the response includes the positive ACK message.

In Aspect 81, the method of Aspect 78 further includes that the response comprises a negative acknowledgment (NACK) message indicating that the transmitter UE does not accept the one or more first adjustments to the sidelink DRX operation.

In Aspect 82, the method of Aspect 78 further includes that the response comprises a media access control (MAC) control element (MAC CE) that includes content indicating a rejection of the one or more first adjustments to the sidelink DRX operation including an explanation for the rejection and an indication of one or more preferences of the receiver UE.

In Aspect 83, the method of Aspect 82 further includes receiving, from the transmitter UE over the sidelink channel, during the at least a portion of the sidelink DRX active duration, a third message comprising an indication of one or more second adjustments to the sidelink DRX operation associated with the one or more preferences of the receiver UE.

In Aspect 84, the method of Aspect 83 further includes transmitting, to the transmitter UE over the sidelink channel, a fourth message comprising a response indicating whether the receiver UE accepts the one or more second adjustments to the sidelink DRX operation; and receiving, from the transmitter UE over the sidelink channel, during the at least a portion of the sidelink DRX active duration, an indication that the transmitter UE intends to confirm the one or more second adjustments to the sidelink DRX operation.

In Aspect 85, the method of Aspect 82 further includes that the at least a portion of the sidelink DRX active duration comprises an on duration period.

In Aspect 86, the method of Aspect 85 further includes that the receiving the first message comprises receiving a single instance of the first message at a particular time within the on duration period.

In Aspect 87, the method of Aspect 85 further includes that the receiving the first message comprises receiving a plurality of repetitions of the first message at respective times within the on duration period.

Aspect 88 is a device including one or more processors and one or more memories in electronic communication with the one or more processors storing instructions executable by the one or more processors to cause the device to implement a method as in any of Aspects 66-87.

Aspect 89 is a system or apparatus including means for implementing a method or realizing an apparatus as in any of Aspects 66-87.

Aspect 90 is a non-transitory computer readable medium storing instructions executable by one or more processors to cause the one or more processors to implement a method as in any of Aspects 66-87.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication performed by a transmitter user equipment (UE), the method comprising:
   determining one or more first adjustments to a sidelink discontinuous reception (DRX) configuration or a sidelink DRX operation for a groupcast or broadcast based on one or more parameters associated with the transmitter UE as measured by the transmitter UE; and
   transmitting, to a receiver UE over a sidelink channel via a broadcast transmission or groupcast transmission, during at least a portion of a sidelink DRX active duration, a first message comprising a media access control (MAC) control element (MAC CE) including an indication of whether the one or more first adjustments for the groupcast or the broadcast are applicable to the receiver UE based on a location of the transmitter UE and a predetermined range.

2. The method of claim 1, wherein the one or more first adjustments to the sidelink DRX configuration corresponds to one or more of an adjustment to a DRX offset value, an adjustment to the at least a portion of the sidelink DRX active duration or an adjustment to a length of the sidelink DRX active duration.

3. The method of claim 1, wherein the first message comprises a media access control (MAC) command, wherein the indication of the one or more first adjustments to the sidelink DRX operation is included in the MAC command.

4. The method of claim 1, wherein the one or more first adjustments to the sidelink DRX operation correspond to one or more of an adjustment to a sidelink DRX timer value or an adjustment to a sidelink DRX timer operation.

5. The method of claim 1, wherein the indication indicates whether the one or more first adjustments are negotiable between the transmitter UE and the receiver UE.

6. The method of claim 1, wherein the indication indicates whether the receiver UE is allowed to forward the indication to another UE over a second sidelink channel.

7. The method of claim 1, further comprising:

receiving, from the receiver UE over the sidelink channel, a second message comprising a response indicating whether the receiver UE accepts the one or more first adjustments.

8. The method of claim 7, wherein the response comprises a positive acknowledgment (ACK) message indicating an acceptance to the one or more first adjustments, further comprising:

transmitting, to the receiver UE over the sidelink channel, during the at least a portion of the sidelink DRX active duration, an indication that the transmitter UE intends to activate the one or more first adjustments when the response includes the positive ACK message.

9. The method of claim 7, wherein the response comprises a negative acknowledgment (NACK) message indicating that the receiver UE does not accept the one or more first adjustments.

10. The method of claim 7, wherein the response comprises a media access control (MAC) control element (MAC CE) that includes content indicating a rejection of the one or more first adjustments including an explanation for the rejection and an indication of one or more preferences of the receiver UE.

11. The method of claim 10, further comprising:

determining one or more second adjustments to the sidelink DRX configuration or the sidelink DRX operation based on the one or more preferences of the receiver UE;

transmitting, to the receiver UE over the sidelink channel, during the at least a portion of the sidelink DRX active duration, a third message comprising an indication of the one or more second adjustments;

receiving, from the receiver UE over the sidelink channel, a fourth message comprising a response indicating whether the receiver UE accepts the one or more second adjustments; and transmitting, to the receiver UE over the sidelink channel, during the at least a portion of the sidelink DRX active duration, an indication that the transmitter UE intends to confirm the one or more second adjustments.

12. The method of claim 10, wherein the at least a portion of the sidelink DRX active duration comprises an on duration period.

13. The method of claim 12, wherein the transmitting the first message comprises transmitting a single instance of the MAC CE at a particular time within the on duration period.

14. The method of claim 12, wherein the transmitting the first message comprises transmitting a plurality of repetitions of the MAC CE at respective times within the on duration period.

15. An apparatus for wireless communication at a transmitter user equipment (UE), the apparatus comprising:

a memory;

a transceiver; and at least one processor communicatively coupled to the memory and the transceiver, the at least one processor configured to:

determine one or more adjustments to a sidelink discontinuous reception (DRX) configuration or a sidelink DRX operation for a groupcast or broadcast based on one or more factors of the transmitter UE as measured by the transmitter UE; and transmit, to a receiver UE over a sidelink channel via a broadcast transmission or groupcast transmission, during at least a portion of a sidelink DRX active duration, via the transceiver, a first message comprising a media access control (MAC) control element (MAC CE) including an indication of whether the one or more adjustments for the groupcast or the broadcast are applicable to the receiver UE based on a location of the transmitter UE and a predetermined range.

16. The apparatus of claim 15, wherein the one or more first adjustments to the sidelink DRX configuration correspond to one or more of an adjustment to a DRX offset value, an adjustment to the at least a portion of the sidelink DRX active duration or an adjustment to a length of the sidelink DRX active duration.

17. The apparatus of claim 15, wherein the first message comprises a media access control (MAC) command, wherein the indication of the one or more first adjustments to the sidelink DRX operation is included in the MAC command, wherein the one or more first adjustments to the sidelink DRX operation correspond to one or more of an adjustment to a sidelink DRX timer value or an adjustment to a sidelink DRX timer operation.

\* \* \* \* \*